US012431145B2

(12) United States Patent
Mundt et al.

(10) Patent No.: US 12,431,145 B2
(45) Date of Patent: Sep. 30, 2025

(54) IMMERSIVE VOICE AND AUDIO SERVICES (IVAS) WITH ADAPTIVE DOWNMIX STRATEGIES

(71) Applicants: Dolby Laboratories Licensing Corporation, San Francisco, CA (US); Dolby International AB, Dublin (IE)

(72) Inventors: Harald Mundt, Fürth (DE); David S. McGrath, Rose Bay (AU); Rishabh Tyagi, Sydney (AU)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 238 days.

(21) Appl. No.: 18/327,623

(22) PCT Filed: Dec. 2, 2021

(86) PCT No.: PCT/US2021/061671
§ 371 (c)(1),
(2) Date: Jun. 1, 2023

(87) PCT Pub. No.: WO2022/120093
PCT Pub. Date: Jun. 9, 2022

(65) Prior Publication Data

US 2024/0135937 A1 Apr. 25, 2024

Related U.S. Application Data

(60) Provisional application No. 63/228,732, filed on Aug. 3, 2021, provisional application No. 63/171,404, filed
(Continued)

(51) Int. Cl.
*G10L 19/008* (2013.01)
*G10L 19/083* (2013.01)
*H04S 7/00* (2006.01)

(52) U.S. Cl.
CPC .......... *G10L 19/008* (2013.01); *G10L 19/083* (2013.01); *H04S 7/00* (2013.01); *H04S 2400/03* (2013.01)

(58) Field of Classification Search
CPC ....... G10L 19/008; G10L 19/083; H04S 7/00; H04S 2400/03
See application file for complete search history.

(56) References Cited

U.S. PATENT DOCUMENTS 8,249,883 B2 8/2012 Mehrotra et al.
8,290,783 B2 10/2012 Schnell
(Continued)

FOREIGN PATENT DOCUMENTS

EP 3079379 A1 10/2016
EP 3550561 A1 10/2019
(Continued)

OTHER PUBLICATIONS

Adrien, "Spatial auditory blurring and applications to multichannel audio coding." Acoustics [physics.class-ph]. PhD diss., Universite Pierre et Marie Curie—Paris VI, Sep. 14, 2011, pp. 1-173, 173 pages.
(Continued)

*Primary Examiner* — Brian L Albertalli

(57) ABSTRACT

Disclosed is an audio signal encoding/decoding method that uses an encoding downmix strategy applied at an encoder that is different than a decoding re-mix/upmix strategy applied at a decoder. Based on the type of downmix coding scheme, the method comprises: computing input downmixing gains to be applied to the input audio signal to construct a primary downmix channel; determining downmix scaling gains to scale the primary downmix channel; generating prediction gains based on the input audio signal, the input downmixing gains and the downmix scaling gains; determining residual channel(s) from the side channels by using
(Continued)

the primary downmix channel and the prediction gains to generate side channel predictions and subtracting the side channel predictions from the side channels; determining decorrelation gains based on energy in the residual channels; encoding the primary downmix channel, the residual channel(s), the prediction gains and the decorrelation gains; and sending the bitstream to a decoder.

1 Claim, 8 Drawing Sheets

Related U.S. Application Data on Apr. 6, 2021, provisional application No. 63/120,365, filed on Dec. 2, 2020.

(56) References Cited

U.S. PATENT DOCUMENTS 8,325,929 B2 12/2012 Koppens
8,972,270 B2 3/2015 Oh
9,137,603 B2 9/2015 Breebaart
9,584,912 B2 2/2017 Koppens
9,761,229 B2 9/2017 Xiang
9,786,285 B2 10/2017 Herre
9,812,136 B2 11/2017 Kristofer
9,848,272 B2 12/2017 Lars
10,448,185 B2 10/2019 Disch
10,986,456 B2 4/2021 Song et al.
2010/0014679 A1 1/2010 Kim
2014/0211947 A1* 7/2014 Wu ...................... G10L 19/008 381/22
2015/0086022 A1 3/2015 Engdegard
2016/0155448 A1 6/2016 Purnhagen
2017/0365264 A1* 12/2017 Disch .................... G10L 19/008
2019/0110147 A1 4/2019 Song
2019/0156841 A1 5/2019 Fatus
2019/0272833 A1* 9/2019 Borss ...................... H04S 3/008
2019/0287542 A1 9/2019 Fueg
2020/0302943 A1 9/2020 Lars
2020/0395023 A1 12/2020 Purnhagen
2022/0036911 A1* 2/2022 Reutelhuber ......... G10L 19/022
2022/0108707 A1* 4/2022 Bouthéon ............. G10L 19/008
2023/0051420 A1* 2/2023 Eksler ................... G10L 19/008
2023/0215444 A1 7/2023 McGrath
2023/0298602 A1* 9/2023 Eichenseer ............. G10L 19/02 704/500

FOREIGN PATENT DOCUMENTS

EP 3079379 B1 7/2020
KR 20140003619 A 1/2014
RU 2666640 C2 9/2018
WO 2024097485 A1 5/2024

OTHER PUBLICATIONS

Bleidt et al., "Development of the MPEG-H TV Audio System for ATSC 3.0", IEEE Transactions On Broadcasting., vol. 63, No. 1, Mar. 1, 2017 (Mar. 1, 2017), pp. 202-236, 35 pages.
McGrath et al., "Immersive Audio Coding for Virtual Reality Using a Metadata-assisted Extension of the 3GPP EVS Codec", ICASSP 2019—2019 IEEE International Conference On Acoustics, Speech and Signal Processing (ICASSP), IEEE, May 12, 2019 (May 12, 2019), pp. 730-734, 5 pages.

* cited by examiner

IMMERSIVE VOICE AND AUDIO SERVICES (IVAS) WITH ADAPTIVE DOWNMIX STRATEGIES

CROSS-REFERENCE TO RELATED APPLICATIONS

This application is a U.S. National Stage application under U.S.C. 371 of International Application No. PCT/US2021/061671, filed on Dec. 2, 2021, which claims the benefit of priority to U.S. Provisional Patent Application No. 63/228,732, filed Aug. 3, 2021, U.S. Provisional Patent Application No. 63/171,404, filed Apr. 6, 2021, and U.S. Provisional Patent Application No. 63/120,365, filed Dec. 2, 2020, each of which is incorporated herein by reference in its entirety.

TECHNICAL FIELD

This disclosure relates generally to audio bitstream encoding and decoding.

BACKGROUND

Voice and audio encoder/decoder ("codec") standard development has recently focused on developing a codec for immersive voice and audio services (IVAS). IVAS is expected to support a range of audio service capabilities, including but not limited to mono to stereo upmixing and fully immersive audio encoding, decoding and rendering, IVAS is intended to be supported by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices.

The IVAS codec efficiently codes an N channel multichannel input including Ambisonics input by downmixing the input into N_dmx channels (where in N_dmx<=N) and generating side information (spatial metadata), these N_dmx channels are then coded by one or more instances of core codecs. The core codec bits along with coded side information are then transmitted to the IVAS decoder. The IVAS decoder decodes the N_dmx downmix channels using one or more instances of core codecs and then reconstructs the multichannel input from the N_dmx channels using the transmitted side information and one or more instances of decorrelators.

At various bitrates, different number of N_dmx may be coded, e.g., at 32 kbps only 1 downmix channel may be coded. One of the N_dmx downmix channels is a representation of a dominant eigen signal (W') of the N channel input (hereinafter, also referred to as "primary downmixing channel") and the rest of the downmix channels may be derived as a function of W' and the multi-channel input. There are two downmixing schemes available in IVAS: a passive downmix scheme and an active downmix scheme. In the passive downmix scheme, the dominant eigen signal (W') is a delayed version of the center channel or the primary input channel (the W channel in case of Ambisonics input). In the active downmix scheme, the eigen signal (W') is obtained by scaling and adding one or more channels in the N channel input. For example, for a first order Ambisonics (FoA) input, $W'=s_0W+s_1Y+s_2X+s_3Z$, where $s_{0-3}$ are input downmixing gains. Thus, the passive downmixing scheme can be viewed as a special case of the active downmixing scheme wherein $s_0=1$, $s_1=0$, $s_2=0$ and $s_3=0$.

SUMMARY

Implementations are disclosed for WAS coding with adaptive downmix strategies, wherein an adaptive downmix is either a passive downmix, an active downmix or a combination of passive and active downmix. In an embodiment, an audio signal encoding method that uses an encoding downmix strategy applied at an encoder that is different than a decoding remix/upmix strategy applied at a decoder, comprises: obtaining, with at least one processor, an input audio signal, the input audio signal representing an input audio scene and comprising a primary input audio channel and side channels; determining, with the at least one processor, a type of downmix coding scheme based on the input audio signal; based on the type of downmix coding scheme: computing, with the at least one processor, one or more input downmixing gains to be applied to the input audio signal to construct a primary downmix channel, wherein the input downmixing gains are determined to minimize an overall prediction error on the side channels; determining, with the at least one processor, one or more downmix scaling gains to scale the primary downmix channel, wherein the downmix scaling gains are determined by minimizing an energy difference between a reconstructed representation of the input audio scene from the primary downmix channel and the input audio signal; generating, with the at least one processor, prediction gains based on the input audio signal, the input downmixing gains and the downmix scaling gains; determining, with the at least one processor, one or more residual channels from the side channels in the input audio signal by using the primary downmix channel and the prediction gains to generate side channel predictions and then subtracting the side channel predictions from the side channels; determining, with the at least one processor, decorrelation gains based on energy in the residual channels; encoding, with the at least one processor, the primary downmix channel, the zero or more residual channels and side information into a bitstream, the side information comprising the prediction gains and the decorrelation gains; and sending, with the at least one processor, the bitstream to a decoder.

In an embodiment, the method further comprises: computing, with the at least one processor, an input covariance based on the input audio signal; and determining, with the at least one processor, the overall prediction error using the input covariance.

In an embodiment, the computation of the downmix scaling gains further comprises: determining, with the at least one processor, upmixing scaling gains as a function of the side information transmitted to the decoder; generating, with the at least one processor, the representation of the input audio scene from the primary downmix channel and the zero or more residual channels by applying the upmixing scaling gains to the primary downmix channel such that the overall energy of the input audio scene is preserved; determining, with the at least one processor, the downmix scaling gains by solving a closed form solution of a polynomial to preserve energy of the input audio scene, where the downmix scaling gains are determined when matching energy of the reconstructed input audio scene with the energy of the input audio scene.

In an embodiment, the upmixing scaling gains to reconstruct the representation of the input audio scene from the primary downmix channel and the zero or more residual channels is a function of the prediction gains and the decorrelation gains transmitted in the side information to the decoder, such that the reconstructed representation of the primary input audio signals is in phase with the primary downmix channel, and the polynomial is a quadratic polynomial.

In an embodiment, the upmixing scaling gains to reconstruct the representation of the input audio scene from the primary downmix channel is a function of the prediction gains and the decorrelation gains transmitted to the decoder, such that the downmix scaling gains obtained by solving the quadratic polynomial scale the prediction gains and the decorrelation gains within a specified quantization range.

In an embodiment, the preceding method further comprises: at the encoder: computing, with at least one encoder processor, a combination of the input downmixing gains to be applied to the input audio signal to generate the primary downmix channel, and the downmix scaling gains, wherein the input downmixing gains are computed as a function of the input covariance of input audio signal; generating, with the at least one encoder processor, the primary downmix channel based on the input audio signal and the input downmixing gains; generating, with the encoder processor, the prediction gains based on the input audio signal and input downmixing gains; determining, with the at least one encoder processor, the residual channels from the side channels in the input audio signal by using the primary downmix channel and the prediction gains to generate the side channel predictions and then subtracting the side channel predictions from the side channels in the input audio signal; determining, with the at least one encoder processor, the decorrelation gains based on the energy in the residual channels; determining, with the at least one encoder processor, the downmix scaling gains to scale the primary downmix channel, the prediction gains and the decorrelation gains, such that the prediction gains or the decorrelation gains, or both are in the specified quantization range; encoding, with the at least one encoder processor, the primary downmix channel, the zero or more residual channels and the side information including the scaled prediction gains, and the scaled decorrelation gains into the bitstream; sending, with the at least one encoder processor, the bitstream to the decoder; at the decoder: decoding, with at least one decoder processor, the primary downmix channel, the zero or more residual channels and the side information including the scaled prediction gains, and the scaled decorrelation gains; setting, with the at least one decoder processor, the upmix scaling gains as a function of the prediction gains and the decorrelation gains; generating, with the at least one decoder processor, the decorrelated signals that are decorrelated with respect to the primary downmix channel; and applying, with the at least one decoder processor, the upmix scaling gains to the combination of the primary downmix channel, the zero or more residual channels and the decorrelated signals to reconstruct the representation of the input audio scene, such that the overall energy of the input audio scene is preserved.

In an embodiment, the input downmixing gains to be applied to the input audio signal to generate the primary downmix channel are computed as a function of a normalized input covariance, such that a numerator of the function is a first constant multiplied by a covariance between the primary input audio channel and the side channels and a denominator of the function is a maximum of a second constant multiplied by the variance of the primary input audio channel and a sum of variances of the side channels of the input audio signal; and generating, with the at least one encoder processor, a linear polynomial by minimizing a prediction error for the side channel predictions and solving for the prediction gains.

In an embodiment, the input downmixing gains to be applied to the input audio signal to generate the primary downmix channel correspond to a passive downmix coding scheme, such that the primary downmix channel is either the same as the primary input audio signal or a delayed version of the primary input audio signal, and the input downmixing gains to be applied to the input audio signal to generate the primary downmix channel are computed as a function of the prediction gains.

In an embodiment, computing the input downmixing gains to be applied to the input audio signal to generate the primary downmix channel comprises: determining, with the at least one processor, a correlation between the primary audio signal and the side channels of the input audio signal; and selecting, with the at least one processor, an input downmixing gain computation scheme based on the correlation.

In an embodiment, the computation of the input downmixing gains to be applied to the input audio signal to generate the primary downmix channel, further comprises: at the encoder determining, with the at least one encoder processor, a set of passive prediction gains based on a passive downmix coding scheme; comparing, with the at least one encoder processor, the set of passive prediction gains against a first threshold value; determining, with the at least one encoder processor, if the set of passive prediction gains are less than or equal to the first threshold value, and if so, computing the first set of input downmixing gains; generating, with the at least one encoder processor, a first set of prediction gains based on the input audio signal and the input downmixing gains; determining, with the at least one encoder processor, if the first set of prediction gains are higher than a second threshold value and if so, computing a second set of input downmixing gains; generating, with the at least one encoder processor, a second set of prediction gains based on the input audio signal and the input downmixing gains; determining, with the at least one encoder processor, the residual channels from the side channels in the input audio signal by using the primary downmix channel and the second set of prediction gains; determining, with the at least one encoder processor, the decorrelation gains based on the residual channel energy that is not being transmitted to the decoder; determining, with the at least one encoder processor, the downmix scaling gains to scale the primary downmix channel, the second set of prediction gains and the decorrelation gains, such that the prediction gains or the decorrelation gains or both are in the specified quantization range; encoding, with the at least one encoder processor, the primary downmix channel, the zero or more residual channels and the side information including the scaled prediction gains and the scaled decorrelation gains into the bitstream; sending, with the at least one encoder processor, the bitstream to the decoder; at the decoder: decoding, with the at least one decoder processor, the primary downmix channel, the zero or more residual channels and the side information including the scaled prediction gains and the scaled decorrelation gains; determining, with the at least one decoder processor, the upmix scaling gains as a function of the prediction gains and the decorrelation gains; generating, with the at least one decoder processor, the decorrelated signals that are decorrelated with respect to the primary downmix channel; and applying, with the at least one decoder processor, the upmix scaling gains to the combination of the primary downmix channel, the zero or more residual channels and the decorrelated signals to reconstruct the representation of the input audio scene, such that the overall energy of the input audio scene is preserved.

In an embodiment, the first set of input downmix gains correspond to a passive downmix coding scheme.

In an embodiment a first set of input downmixing gains correspond to an active downmixing scheme wherein the first set of input downmixing gains to be applied to the input audio signal to generate the primary downmix channel are computed as a function of a normalized input covariance such that a numerator in the function is a first constant multiplied by a covariance of the primary input audio channel and the side channels and a denominator in the function is a maximum of a second constant multiplied by a variance of the primary input audio channel and a sum of variances of the side channels.

In an embodiment, a second set of input downmixing gains correspond to an active downmix coding scheme, wherein the primary downmix channel is obtained by applying the second set of input downmixing gains to the primary input audio channel and the side channels and then adding the channels together.

In an embodiment, the second set of input downmixing gains are coefficients of a quadratic polynomial.

In an embodiment, the threshold against which the prediction gains are compared is computed such that the prediction gains are in the specified quantization range.

In an embodiment, computing the input downmixing gains to be applied to the input audio signal to generate the downmix channel comprises: computing a scaling factor to scale the primary input audio signal; computing a covariance of the scaled primary input audio signal; performing eigen analysis on the covariance of the scaled primary input audio signal; choosing an eigen vector corresponding the largest eigen value as the input downmixing gains such that the primary downmix channel is positively correlated with the primary input audio channel; and computing the downmix scaling gains to scale the primary downmix channel and the side information such that the overall energy of the input audio scene is preserved.

In an embodiment, computing the input downmixing gains to be applied to the input audio signal to generate the primary downmix channel, comprises: computing a scaling factor to scale the primary input audio channel; computing the input downmixing gains based on the scaled primary input audio channel by setting the input downmixing gains as a function of the prediction gains of the scaled primary input audio channel; and computing the downmix scaling gains to scale the primary downmix channel and side information such that the overall energy of the input audio scene is preserved.

In an embodiment, the scaling factor to scale the primary input audio channel is a ratio of a variance of the primary input audio channel and a square root of a sum of variances of the side channels.

In an embodiment, the computation of input downmixing gains to be applied to the input audio signal to generate a primary downmix channel, further comprises: determining, with the at least one encoder processor, the prediction gains based on a passive downmix coding scheme; computing, with the at least one encoder processor, first downmix scaling gains to scale the primary downmix channel and side information such that the overall energy of the input audio scene is preserved in the reconstructed representation of input audio scene; determining, with the at least one encoder processor, if the first downmix scaling gains are less than or equal to a first threshold value and, as a result, computing a first set of input downmixing gains; determining, with the at least one encoder processor, if the first downmix scaling gains are higher than a second threshold value and, as a result, computing a second set of input downmixing gains; and generating, with the at least one encoder processor, a second set of prediction gains based on the input audio signal and the first or second input downmixing gains; at the decoder: decoding, with the at least one decoder processor, the primary downmix channel and the side information including the scaled second set of prediction gains and the scaled decorrelation gains; determining, with the at least one decoder processor, the upmix scaling gains as a function of the second set of prediction gains and the decorrelation gains; generating, with the at least one decoder processor, the decorrelated signals that are decorrelated with respect to the primary downmix channel; and applying, with the at least one decoder processor, the upmix scaling gains to the combination of the primary downmix channel and the decorrelated signals to reconstruct the representation of the input audio scene, such that the overall energy of the input audio scene is preserved.

In an embodiment, the first set of input downmixing gains correspond to a passive downmix coding scheme.

In an embodiment, the second set of input downmixing gains correspond to an active downmix coding scheme, wherein the primary downmix channel is obtained by applying the input downmixing gains to the primary input audio channel and the side channels and then adding the channels together.

In an embodiment, a system comprising: one or more processors; and a non-transitory computer-readable medium storing instructions that, upon execution by the one or more processors, cause the one or more processors to perform operations according to any of the methods described above.

In an embodiment, a non-transitory computer-readable medium storing instructions that, upon execution by one or more processors, cause the one or more processors to perform operations according to any of the methods described above.

Other implementations disclosed herein are directed to a system, apparatus and computer-readable medium. The details of the disclosed implementations are set forth in the accompanying drawings and the description below. Other features, objects and advantages are apparent from the description, drawings and claims. Particular implementations disclosed herein provide one or more of the following advantages. Active downmix strategies are implemented at an IVAS decoder to improve the quality of decoded audio signals, such as the four FoA channels, The disclosed active downmixing techniques can be used with a single or multi-channel downmix channel configuration. The active downmix coding scheme compared to the passive downmix scheme offers an additional scaling term for reconstructing the W channel at the decoder, which can be exploited to ensure better estimation of parameters used for reconstruction of the FoA channels (e.g., spatial metadata).

Additionally, potential improvements are disclosed for single and multiple channel downmix cases. In an embodiment, the active downmix coding scheme is operated adaptively, wherein one possible operation point is the passive downmix coding scheme.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments, It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation," The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

IVAS Use Case Examples

Figure 1:
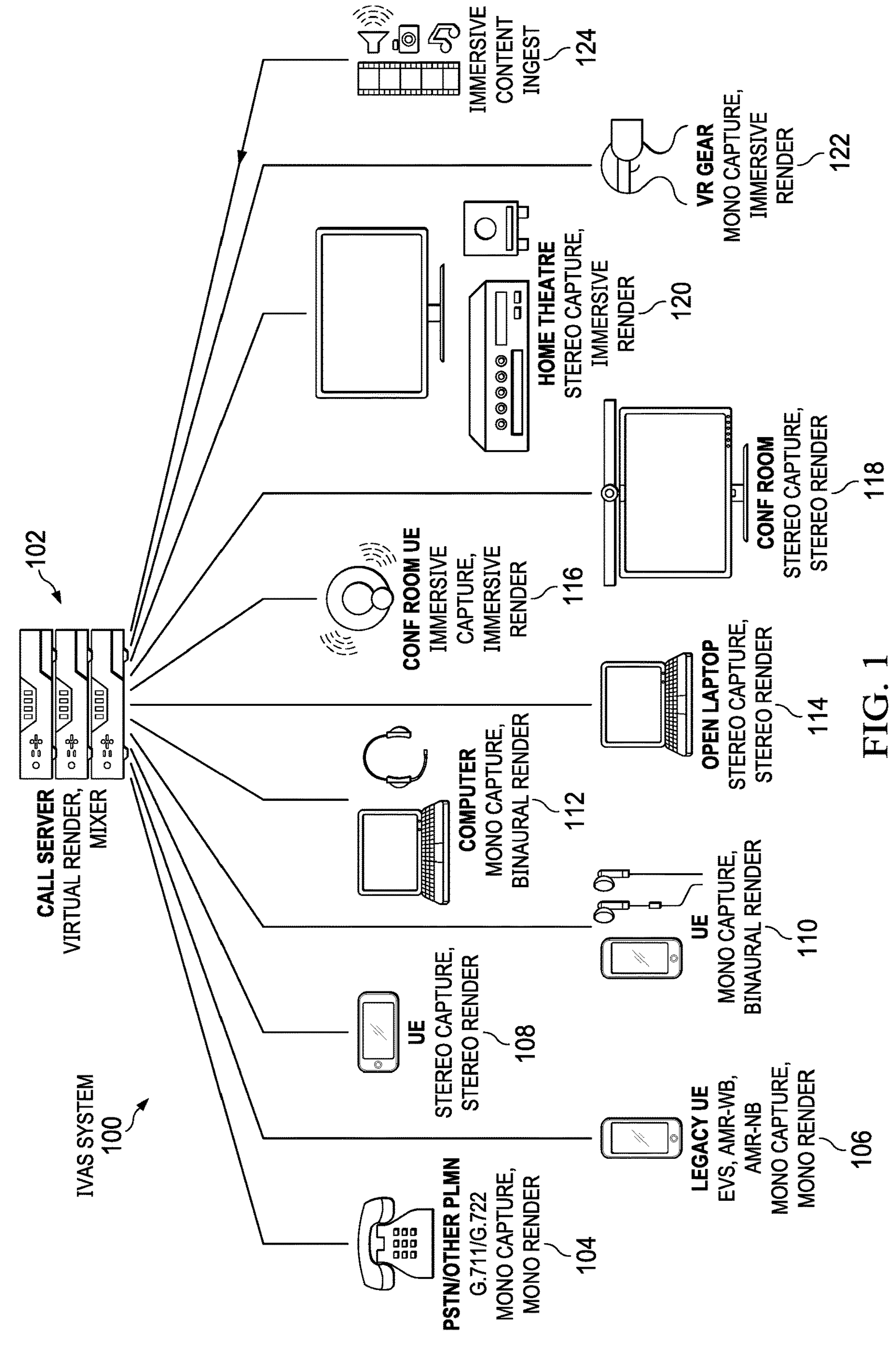
FIG. 1 illustrates use cases for an IVAS codec, according to an embodiment.

FIG. 1 illustrates use cases 100 for an IVAS codec 100, according to one or more implementations. In some implementations, various devices communicate through call server 102 that is configured to receive audio signals from, for example, a public switched telephone network (PSTN) or a public land mobile network device (PLM) illustrated by PSTN/OTHER. PLMN 104. Use cases 100 support legacy devices 106 that render and capture audio in mono only, including but not limited to: devices that support enhanced voice services (EVS), multi-rate wideband (AMR-WB) and adaptive multi-rate narrowband (AMR-NB), Use cases 100 also support user equipment (UE) 108, 114 that captures and renders stereo audio signals, or UE 110 that captures and binaurally renders mono signals into multichannel signals. Use cases 100 also support immersive and stereo signals captured and rendered by video conference room systems 116, 118, respectively. Use cases 100 also support stereo capture and immersive rendering of stereo audio signals for home theatre systems 120, and computer 112 for mono capture and immersive rendering of audio signals for virtual reality (VR) gear 122 and immersive content ingest 124.

Example IVAS CODEC

Figure 2:
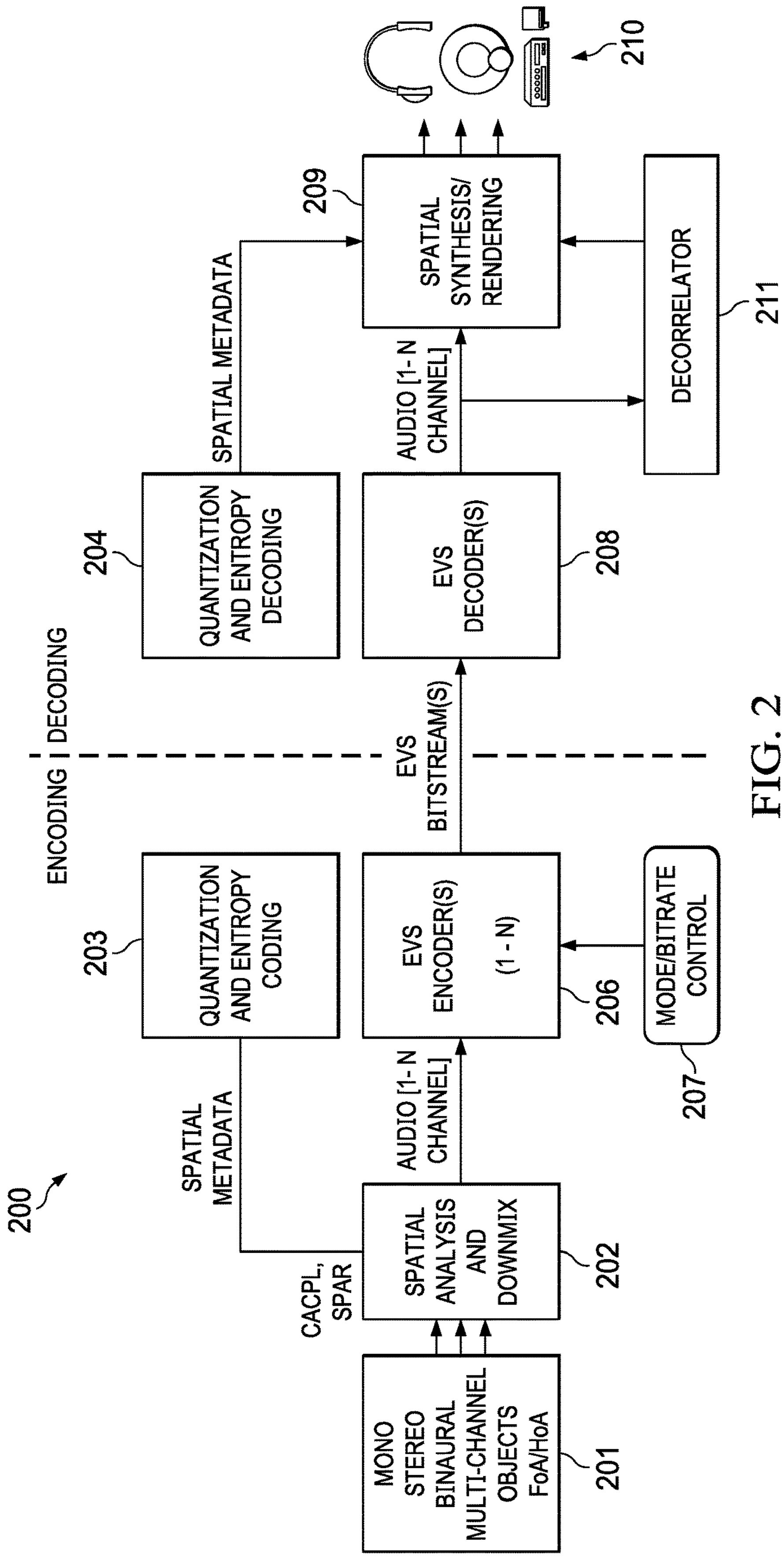
FIG. 2 is a block diagram of a system for encoding and decoding IVAS bitstreams, according to an embodiment.

FIG. 2 is a block diagram of IVAS codec 200 for encoding and decoding WAS bitstreams, according to an embodiment. IVAS codec 200 includes an encoder and far end decoder. The IVAS encoder includes spatial analysis and downmix unit 202, quantization and entropy coding unit 203, core encoding unit 206 and mode/bitrate control unit 207. The IVAS decoder includes quantization and entropy decoding unit 204, core decoding unit 208, spatial synthesis/rendering, unit 209 and decorrelator unit 211.

Spatial analysis and downmix unit 202 receives N-channel input audio signal 201 representing an audio scene. Input audio signal 201 includes but is not limited to: mono signals, stereo signals, binaural signals, spatial audio signals (e.g., multi-channel spatial audio objects), FoA, higher order Ambisonics (HoA) and any other audio data. The N-channel input audio signal 201 is downmixed to a specified number of downmix channels (N_dmx) by spatial analysis and downmix unit 202. In this example, N_dmx is <=N. Spatial analysis and downmix unit 202 also generates side information (e.g., spatial metadata) that can be used by a far end IVAS decoder to synthesize the N-channel input audio signal 201 from the N_dmx downmix channels, spatial metadata and decorrelation signals generated at the decoder. In some embodiments, spatial analysis and downmix unit 202 implements complex advanced coupling (CACPL) for analyzing/downmixing stereo/FoA audio signals and/or SPAtial reconstruction (SPAR) for analyzing/downmixing FoA audio signals. In other embodiments, spatial analysis and downmix unit 202 implements other formats.

The N_dmx channels are coded by N_dmx instances of mono or one or more multi-channel core codecs included in core encoding unit 206 (e.g., an EVS core encoding unit) and the side information (e.g., spatial metadata (MD)) is quantized and coded by quantization and entropy coding unit 203. The coded bits are then packed together into bitstream(s) (e.g., IVAS bitstream(s)) and sent to the IVAS decoder. Although in this example embodiment and embodiments that follow an EVS codec may be described, any mono, stereo or multichannel codec can be used as a core codec in IVAS codec 200.

In some embodiments, quantization can include several levels of increasingly coarse quantization (e.g., fine, moderate, coarse and extra coarse quantization), and entropy coding can include Huffman or Arithmetic coding.

In some embodiments, core encoding unit 206 complies with 3GPP TS 26.445 and provides a wide range of functionalities, such as enhanced quality and coding efficiency for narrowband (EVS-NB) and wideband (EVS-WB) speech services, enhanced quality using super-wideband (EVS-SWB) speech, enhanced quality for mixed content and music in conversational applications, robustness to packet loss and delay jitter and backward compatibility to the AMR-WB codec.

In some embodiments, core encoding unit 206 includes a pre-processing and mode/bitrate control unit 207 that selects between a speech coder for encoding speech signals and a perceptual coder for encoding audio signals at a specified bitrate based on output of mode/bitrate control unit 207. In some embodiments, the speech encoder is an improved variant of algebraic code-excited linear prediction (ACELP), extended with specialized linear prediction (LP)-based modes for different speech classes, In some embodiments, the perceptual encoder is a modified discrete cosine transform (MDCT) encoder with increased efficiency at low delay/low nitrates and is designed to perform seamless and reliable switching between the speech and audio encoders.

At the decoder, the N_dmx channels are decoded by corresponding N_dmx instances of mono codecs included in core decoding unit 208 and the side information is decoded by quantization and entropy decoding unit 204, A primary downmix channel (e.g. the W channel in an FoA signal format) is fed to decorrelator unit 211 which generates N-N_dmx decorrelated channels. The N_dmx downmix channels, N-N_dmx decorrelated channels and side information are fed to spatial synthesis/rendering unit 209 which uses these inputs to synthesize or regenerate the original N-channel input audio signal. In an embodiment, N_dmx channels are decoded by mono codecs other than EVS mono codecs. In other embodiments, N_dmx channels are decoded by a combination of one or more multi-channel core coding units and one or more single channel core coding units.

IVAS Coding with Active Downmix Strategies

1.0 Introduction

The disclosure below describes active downmix strategies to improve the quality of the decoded FoA channels. The proposed active downmixing techniques can be used with a single or multi-channel downmix channel configuration. The active downmix coding scheme compared to the passive downmix scheme offers an additional scaling term for reconstructing the W channel at the decoder, which can be exploited to ensure better estimation of parameters used for reconstruction of the FoA channels (e.g., spatial metadata).

In addition, an active downmix coding scheme is explored and potential improvements proposed for single and multiple channel downmix cases. In an embodiment, the active downmix scheme can perform adaptively, where one possible operation point is the passive downmix coding scheme.

2.0 Terminology and Problem Statement

2.1. Example Implementation of Passive Downmixing with SPAR with FoA Input

The SPAR encoder, when operating with FoA input, converts an FoA input audio signal representing an audio scene into a set of downmix channels and spatial parameters used to regenerate the input signal at the SPAR decoder. The downmix signals can vary from 1 to 4 channels and the parameters include prediction parameters P, cross-prediction parameters C, and decorrelation parameters $P_d$. These parameters are calculated from an input covariance matrix of a windowed input audio signal in a specified number of frequency bands (e.g., 12 frequency bands).

An example representation of SPAR parameters extraction is as follows:

1. Predict all side signals (Y, Z, X) from the primary audio signal W using Equation [1]:

$$\begin{bmatrix} W \\ Y' \\ Z' \\ X' \end{bmatrix} = \begin{bmatrix} 1 & 0 & 0 & 0 \\ -pr_Y & 1 & 0 & 0 \\ -pr_Z & 0 & 1 & 0 \\ -pr_X & 0 & 0 & 1 \end{bmatrix} \begin{bmatrix} W \\ Y \\ Z \\ X \end{bmatrix}, \quad [1]$$

where, as an example, the prediction coefficient for the predicted channel Y' is calculated as shown in Equation [2]:

$$pr_Y = \frac{R_{YW}}{\max(R_{WW}, \epsilon)} \frac{1}{\max\left(1, norm_{scale} * \sqrt{|R_{YY}|^2 + |R_{ZZ}|^2 + |R_{XX}|^2}\right)}, \quad [2]$$

Here, $norm_{scale}$ is the normalization scaling factor and is a constant between 0 and 1, and $R_{YW}$=cov (Y, W) are elements of the input covariance matrix corresponding to channels Y and W. Similarly, the Z' and X' residual channels have corresponding parameters $pr_z$ and $pr_x$. P is the vector of the prediction parameters $P=[pr_Y, pr_Z, pr_X]^T$ also referred to as $[p_1, p_2, p_3]^T$, in some embodiments. The above mentioned downmixing is also referred to as passive W downmixing in which if either does not get changed at all or simply delayed during the downmix process.

2. Remix the W channel and predicted (Y', Z', X') channels from most to least acoustically relevant, where remixing includes reordering or recombining channels based on some methodology, as shown in Equation [4]:

$$\begin{bmatrix} W \\ A' \\ B' \\ C' \end{bmatrix} = [\text{remix}] \begin{bmatrix} W \\ Y' \\ Z' \\ X' \end{bmatrix}. \quad [4]$$

Note that one embodiment of remixing could be re-ordering of the input channels to W, Y', X', Z', given the assumption that audio cues from left and right are more important than front to back, and lastly up and down cues.

3. Calculate the covariance of the 4-channel post-prediction and remixing downmix as shown in Equations [5] and [6]:

$$R_{pr} = [\text{remix}][\text{predict}].R.[\text{predict}]^H[\text{remix}]^H, \quad [5]$$

$$R_{pr} = \begin{bmatrix} R_{WW} & R_{Wd} & R_{Wu} \\ R_{dW} & R_{dd} & R_{du} \\ R_{uW} & R_{ud} & R_{uu} \end{bmatrix}, \quad [6]$$

where dd represents the extra downmix channels beyond W (e.g., the $2^{nd}$ to N-$dmx^{th}$ channels), and u represents the channels that need to be wholly regenerated (e.g., $(N\_dmx+1)^{th}$ to 4 channels).

For the example of a WABC downmix ith 1-4 downmix channels, d and u represent the following channels, where the placeholder variables A, B, C can be any combination of X, Y, Z channels in FoA):

| N | Residual Channels | Predicted Channels |
|---|---|---|
| 1 | — | A', B', C' |
| 2 | A' | B', C' |
| 3 | A', B' | C' |
| 4 | A', B', C' | — |

4. From these calculations, determine if it is possible to cross-predict any remaining portion of the fully parametric channels from the residual channels being sent. The required extra C coefficients are:

$$C=R_{ud}(R_{dd}+I\max(\epsilon,tr(R_{dd})*0.005))^{-1}. \quad [7]$$

Therefore, C has the shape (1×2) for a 3-channel downmix, and (2×1) for a 2-channel downmix. One implementation of spatial noise filling does not require these C parameters and these parameters can be set to 0. An alternate implementation of spatial noise filling may also include C parameters.

5. Calculate the remaining energy in parameterized channels that must be filled by decorrelators. The residual energy in the upmix channels $Res_{uu}$ is the difference between the actual energy R. (post-prediction) and the regenerated cross-prediction energy $Reg_{uu}$:

$$Reg_{uu} = CR_{dd}C^H, \quad [8]$$

$$Res_{uu} = R_{uu} - Reg_{uu}, \quad [9]$$

$$NRes_{uu} = \frac{Res_{uu}}{\max(\varepsilon, Rww, \text{scale}_{*tr}(|Res_{uu}|))}, \quad [10]$$

$$P_d = \text{diag}\left(\sqrt{\max(0, \text{real } (\text{diag}(NRes_{uu})))}\right), \quad [11]$$

where scale is a normalization scaling factor. Scale can be a broadband value (e.g., scale=0.01) or frequency dependent, and may take a different value in different frequency bands (e.g., scale =linspace (0.5, 0.01, 12) when the spectrum is divided into 12 bands). The parameters in $P_d$ in Equation [11] dictate how much decorrelated components of W are used to recreate A, B and C channels, before un-prediction and un-mixing.

With 1 channel passive downmix configuration, only W channel, P ($p_1$, $p_2$, $p_3$) parameters and $P_d$ ($d_1$, $d_2$, $d_3$) parameters are coded and sent to decoder.

In the passive downmix coding scheme, the side channels Y, X, Z are predicted at the decoder from the transmitted downmix W using three prediction parameters P. The missing energy in the side channels is filled up by adding scaled versions of the decorrelated downmix D(W) using the decorrelation parameters $P_d$. For passive downmixing, reconstruction of FoA input is done as follows:

$$U_{pas}=pW+P_dD(W), \quad [12]$$

where $p=[1\ p_1\ p_2\ p_3]^T$ and $P_d=[0\ d_1\ d_2\ d_3]^T$, and D(W) describes the decorrelator outputs with W channel as input to decorrelator block. Note that assuming perfect decorrelators and no quantization of prediction and decorrelator parameters, this scheme achieves perfect reconstruction in terms of the input covariance matrix.

Passive downmixing often fails to reconstruct the input scene at decoder output with a lower downmix channel configuration due to imperfect decorrelators and a limited quantization range available for the prediction parameters and decorrelator parameters. Hence, the active downmixing scheme is desired to reduce the overall prediction error by generating better prediction coefficient estimates that are within a desired quantization range.

2.2 Existing Active Downmix Coding Scheme

An existing solution to do active downmixing is described in Appendix A under heading 1. Active Predictor used in IVAS and 2. A solution based on rule 3B. This solution aims at generating a representation of dominant eigen signal by scaling and adding W, X, Y, Z input channels. The prediction matrix or downmix matrix is given by Equation (6) in Appendix A as:

$$dmx_{[4\times4]} = \begin{pmatrix} 1 & fg\hat{u}^* \\ -g\hat{u} & I_3 - g^2 f\hat{u}\hat{u}^* \end{pmatrix} \quad [13]$$

The downmix channels W' are computed as:

$$W'=dmx\times U, \quad [14]$$

where U is input FoA signal given as $$U=[WXYZ]^T, \quad [15]$$

$g\hat{u}$ are the prediction parameters $[p_1, p_2, p_3]$ that are coded and sent to the decoder, $g=\sqrt{(p_1^2+p_2^2+p_3^2)}$, $\hat{u}$ is unit vector, f is a constant (e.g., 0.5) known to both the encoder and decoder. For a single channel downmix, the $W'=W+fp_1X+fp_2Y+fp_3Z$ channel is coded and sent to the decoder along with prediction parameters and decorrelation d parameters. The decoder applies an upmix matrix to W' given as:

$$umx_{[4\times4]} = \begin{pmatrix} (1 - fg^2) & -gf\hat{u}^* \\ g\hat{u} & dI_3 \end{pmatrix}, \quad [16]$$

where d are the decorrelation parameters ($d_1$, $d_2$, $d_3$), and the reconstructed FoA signal is given as:

$$U'=umx\times[W'D1(W')D2(W')D2(W')]^T, \quad [17]$$

where D1(W'), D2(W') and D3(W') are three outputs of decorrelator block.

This solution in general provides better estimates of prediction parameters over a passive downmix scheme, brings the prediction parameters within a desired quantization range and reduces the overall prediction error, However, the solution relies on decorrelator outputs to reconstruct the W channel from the downmix W' and thus can lead to audio artifacts. Also, given that the input downmixing gains ($fg\hat{u}$) are directly proportional to prediction parameters, it has been observed that this solution provides higher estimates of prediction parameters than desired and can result in spatial distortion in reconstructed FoA output.

2.3 Example Embodiments of Proposed Adaptive Downmix Coding Schemes 2.3.1 Adaptive Downmix Coding Scheme The goal of the adaptive downmix strategies (herein also referred to as adaptive active downmix strategies) described below is to provide better estimation of prediction parameters p by computing the input downmixing gains (herein also referred to as active downmixing coefficients) $fg\hat{u}$ given in [13] by various methods.

In some embodiments, the input downmixing gains are computed such that the total square prediction error is minimized, wherein the prediction waveform error is given as:

$$E=pW'-U, \quad [18]$$

and the mean squared prediction errors (prediction error per signal) (4×1) are given by:

$$E_p=\text{diag}(EE^T), \quad [19]$$

where the total square prediction error is given by:

$$E_{tot}=E_pE_p^T, \quad [20]$$

where p is the inverse prediction matrix.

In some embodiments, the input downmixing gains are computed such that the post prediction covariance given by f̂ in Equation (10) in Appendix A is minimized.

In some embodiments, the input downmixing gains are computed such that the prediction parameters are in a desired quantization range.

It has been observed that for low downmix channel configurations, the audio quality with SPAR coding is better with the disclosed active downmix coding scheme than with the current passive downmix coding scheme. For some audio content, however, the quality is better with the passive downmix scheme, suggesting an adaptive operation of the active downmix coding scheme.

Based on the above described observations an adaptive downmix scheme is disclosed below that computes input downmixing gains depending on signal properties. This signal dependent computation of input downmixing gains can be incorporated per processed frequency band and audio frame or for all frequency bands per audio frame.

2.3.1.1 Selecting Input Downmix Gains Based on Minimum Error

In an embodiment, the selection of factor "f" in input downmixing gains fgû* given in [13] can be derived from calculating the total prediction error (Equation [20]) for each possible f and selecting the one with the smallest total prediction error. Note that once the input covariance R is available the total prediction error can be computed efficiently in the covariance domain.

2.3.1.2 Adaptive Downmix Scheme Based on Voice Activity

It has been observed that for voice signals a high value of f can hurt the performance of spatial comfort noise during data transmission. Background noise in speech signals is generally diffused and an aggressive active W scheme can result in the W downmix channel taking more energy from the residual X, Y and Z channels than desired. In full parametric coding, the comfort noise solution decoder generates 4 uncorrelated comfort noise channels with the same spectral shape as the active W downmix channel. These uncorrelated channels are then shaped using SPAR parameters. Given the extremely low bitrate, coarse quantization of SPAR parameters and fully parametric reconstruction during discontinuous transmission mode (DTX) frames, where for the current parametric reconstruction the additional energy in active W channel is never removed and the output W channel is spatially collapsed, high energy comfort noise.

It is also desired that the reconstructed background noise at the decoder sound continuous during voice activity detection (VAD) active frames and VAD inactive frames. In an embodiment, a passive downmix scheme during VAD inactive frames and active scheme during VAD active frames can hurt the overall performance of the IVAS codec. With subjective evaluations, however, it was observed that a reduced value of f (e.g., 0.25) works well in general for inactive frames while a high value of f (e.g., 0.5) works well for active frames. This conditional application off also helps with keeping the transition between active and inactive frames smooth.

In an embodiment, SPAR in an active W configuration dynamically chooses different values off based on the VAD decision, where the VAD takes as input the FoA signal. A high value of f can be chosen when VAD is active, while a low value of f can be chosen when VAD is inactive.

2.3.1.3 Adaptive Downmix Coding Scheme Based On Desired Range of Prediction Parameters The following embodiments of adaptive downmix strategies are described in reference to Appendix A (Analysis of ActiveW Method). References to equations in Appendix A are placed within in parentheses to distinguish from equations not in Appendix A, which are placed between brackets.

First Variant of IVAS Method (Based on Rule 3B in Appendix A)

In an embodiment, if f=0, the decoding reverts to the passive downmix scheme described above, resulting in the problematic issue that the prediction parameters "g" may be unbounded. By setting f to a larger value (e.g., f=0.5), the range of the positive real value "g" in Equation (17) in Appendix A can be constrained to $$g \in \left[0, \frac{1}{\sqrt{f}}\right].$$

There is some evidence that stability of the active downmix strategy can be improved by keeping f small, and only using a larger value off when it is necessary to prevent g from becoming too large.

In an embodiment, a potential variant of the active downmix strategy is to set f=0 whenever possible, as long as this keeps g<g', where in g' is the desired range for prediction parameters, otherwise choose f so that g=g'. If this leads to an excessively large value of g (if g>g'), set g=g' in Equation (17) in Appendix A, and then solve a quadratic equation $Q(f)=(\beta g'^3)f^2+(2\alpha g'^2-\beta g')f+wg'-\alpha$ to find f, by setting g=g' and solving for f:

$$f = \frac{(\beta - 2\alpha g') + \sqrt{(4\alpha^2 g'^2 + \beta^2 - 4\beta g'^2 w)}}{2\beta g'^2}. \quad [21]$$

To ensure that the quadratic equation always has at least one real solution, and that the largest real solution lies in the range f $$\in \left[0, \frac{1}{g'^2}\right],$$

it is noted that:

$$Q\left(\frac{1}{g'^2}\right) = wg' + \alpha \geq 0, \quad [22]$$

where α≥0, ω≥0 and g'≥0, Q(0)=wg'−α<0 because $$\frac{\alpha}{\omega g'} > 1,$$

and where there is a positive-going zero crossing in the range f $$\in \left[0, \frac{1}{g'^2}\right].$$

Some example values for g' can be 1.0 (f[0 to 1]), 1.414 (f[0 to 0.5]), and 2 (f[0 to 0.25]). The above observations can be summarized as shown in Equations [23] and [24]:

$$\text{if } \alpha \le g'w \begin{cases} f = 0 \\ g = \frac{\alpha}{\omega}, \end{cases} \quad [23]$$

$$\text{otherwise} \begin{cases} g = g' \\ f = \frac{(\beta - 2\alpha g') + \sqrt{(4\alpha^2 g'^2 + \beta^2 - 4\beta g'^2 w)}}{2\beta g'^2}. \end{cases} \quad [24]$$

Note that Equations [23] and [24] above violate Rule 1 in Appendix A (keeping f constant), and may therefore require additional metadata to be signaled to the decoder. Sending of additional metadata to indicate value "f" can be avoided by using the scaling method described in section 2.3.1.4.

Second Variant of IVAS Method (Based on Rule 3B in Appendix A)

It is observed that a small value of f is desired when g is small, and a larger value of f may give better results when g is large. There may be some linear relationship between f and g that can be exploited to give optimum results in all cases. For example, if f=kg, where k is constant is ≤1.0 (typically, 0.5).

$$\text{fun}(g): \beta k^2 g^5 + 2\alpha k g^3 - \beta k g^2 + wg - \alpha, \quad [25]$$

and this function is well behaved when $$\text{fun}(0) = -\alpha,\ \text{fun}(0) \le 0, \quad [26]$$

$$\text{fun}(k^{-1/3}) = \alpha + wg,\ \text{fun}(k^{-1/3}) \ge 0. \quad [27]$$

Accordingly there is at least one root between 0 and $k^{-1/3}$. The derivative of this function is:

$$\text{fun}'(g): 5\beta k^2 g^4 + 6\alpha k g^2 - 2\beta k g^1 + w, \quad [28]$$

$$\text{fun}'\left((5k/2)^{-\frac{1}{3}}\right): 6\alpha k g^2 + w \ge 0. \quad [29]$$

The derivative of this polynomial is monotonically increasing after $$g = (5k/2)^{-\frac{1}{3}}.$$

If fun $$\left((5k/2)^{-\frac{1}{3}}\right) < 0$$

then there is only one root between $$(5k/2)^{-\frac{1}{3}} \text{ and } k^{-\frac{1}{3}},$$

which is the largest root which makes it easier for Newton Raphson, or other suitable solver, to converge to the desired root if the initial condition is set appropriately. If fun $$\left((5k/2)^{-\frac{1}{3}} > 0\right.$$

then the largest root is between $$g = 0 \text{ and } g = (5k/2)^{-\frac{1}{3}},$$

and in such cases there can be multiple roots between $$g = 0 \text{ and } g = (5k/2)^{-\frac{1}{3}}.$$

In an embodiment, to find the largest root Newton Raphson can be initialized with $$g = (k)^{-\frac{1}{3}} \text{ or } g = (5k/2)^{-\frac{1}{3}},$$

and the number of iterations can be increased, and the learning rate tuned, such that divergence is avoided and the Newton Raphson method slowly converges to the largest root. Note that with k=0.5, g will be between 0 to 1.26 and $$(5k/2)^{-\frac{1}{3}} = 0.9283.$$

Sending of additional metadata to indicate value "f" can be avoided by using the scaling method described in section 2.3.1.4.

2.3.1.4 Active Downmix Coding with Scaling

Variant of IVAS Method (Based on Rule 3B in Appendix A)

The original inverse prediction matrix of Equation (8) in Appendix A is given as:

$$InvPred_{[4\times4]} = \begin{pmatrix} (1 - fg^2) & -gf\hat{u}^* \\ g\hat{u} & I_3 \end{pmatrix}. \quad [30]$$

With this inverse prediction matrix, the primary channel W can be reconstructed from W', Y', X' and Z', where W', Y', X' and Z' are the downmix channels after prediction, But in the case of parametric reconstruction there are only $N_{dmx}$ downmix channels, where $N_{dmx}$ is less than 4. In that case, the missing downmix channel is parametrically reconstructed using banded energy estimates of the downmixed channel and a decorrelated W' signal. With parametric reconstruction the inverse prediction matrix given in [30] may not be able to reconstruct W from W' and may corrupt W further.

In an embodiment, a method to solve this problem is illustrated below for a channel downmix.

A new inverse prediction matrix is given as follows:

$$InvPred_{[4\times4]} = \begin{pmatrix} (1 - f_s g'^2 & 0) \\ g'\hat{u} & I_3 \end{pmatrix}, \qquad [31]$$

where g' is g/r where r is a scaling factor applied to W', such that the W channel output of inverse prediction is energy matched with W channel input to the prediction matrix, $f_s$, is a constant.

In an embodiment, the value of "$f_s$" in the inverse prediction matrix given by Equation [31] is a constant value that is independent of the value of factor "f" used at the encoder while computing input downmixing gains. In this embodiment, the input downmixing gains can be computed without sending any additional metadata to decoder.

A new prediction matrix is given as follows:

$$Pred_{[4x4]} = \begin{pmatrix} r & frg\hat{u}^* \\ -g\hat{u} & I_3 - g^2 f\hat{u}\hat{u}^* \end{pmatrix} \qquad [32]$$

The post prediction matrix and post inverse prediction matrix (also referred to as output covariance matrix) can be computed as:

$$postpred_{cov} = Pred * in_{cov} * Pred', \qquad [33]$$

where "Pred" is the prediction matrix given in Equation [32]and $in_{cov}$ is the covariance matrix of input channels. The output covariance matrix is given by:

$$out_{cov} = InvPred * postpred_{cov} * InvPred', \qquad [34]$$

where "InvPred" is the inverse prediction matrix given in Equation [31].

Let w=$in_{cov}$(1, 1) (i.e. the variance of input W channel) m=$postpred_{cov}$(1, 1) (i.e. the variance of post-predicted W channel) when r=1.

Substituting "Pred" from Equation [32] and "InvPred" from Equation [31] into Equation [33] and Equation [34] gives:

$$out_{cov}(1, 1) = mr^2\left(1 - f_S\left(\frac{g}{r}\right)^2\right)^2. \qquad [35]$$

To match the variance $out_{cov}$(1, 1)=w, $$w = mr^2\left(1 - f_S\left(\frac{g}{r}\right)^2\right)^2, \qquad [36]$$

which can be solved for r to give:

$$r = \frac{g_w + \sqrt{g_w^2 + 4f_S g^2}}{2}, \qquad [37]$$

where $$g_w = \sqrt{\frac{w}{m}}$$

and g are computed by solving Equation (17) in Appendix A or any other method mentioned in various embodiments.

Post prediction, the downmix channels X', Y' and Z' indicate the residual channels containing the signal that cannot be predicted from W'. In a parametric upmix case, one or more residual channels may not be sent to the decoder; rather, a representation of their energy levels (also referred to as Pd or decorrelation parameters) are coded and sent to decoder. The decoder parametrically regenerates the missing residual channels using W', decorrelator block and Pd parameters.

The Pd parameters can be computed as follows:

$$NResuu = \frac{Resuu}{\max(\varepsilon, RWW, \text{scale} * tr(|Resuu|))}, \qquad [38]$$

$$Pd = \text{diag}\left(\sqrt{\max(0, \text{real}(\text{diag}(NResuu)))}\right), \qquad [39]$$

where the "scale" parameter is a normalization scale factor: In an embodiment, scale can be a broadband value (e.g., scale=0.01) or frequency dependent and may take a different value in different frequency bands (e.g., scale=linspace (0.5, 0.01, 12) when the spectrum is divided into 12 bands), RWW=$mr^2$=$postpred_{cov}$(1, 1) as per Equation [33] and Resuu is the covariance matrix of residual channels which are to be parametrically upmixed at the decoder. For a 1-channel downmix Resuu is a 3×3 covariance matrix given by Resuu=$postpred_{cov}$(2:4, 2:4).

In some implementations, the downmix scale factor 'r' can be a function of both prediction parameters and decorrelation parameters, where decorrelation parameters for one channel downmix are defined in Equation [39], For a 1-channel downmix with improved scaling, the inverse prediction matrix becomes:

$$InvPred_{[4\times4]} = \begin{pmatrix} (1 - f_s g'^2 - f_s' d'^2) & 0 \\ g'\hat{u} & I_3 \end{pmatrix}. \qquad [40]$$

Here, $f_s$ and $f_s$' are constants for, e.g., $f_s$=$f_s$'=0.5, d'=d/r and g'=g/r, where r=f(g, d), d=sqrt(sum(diag(Pd))) and Pd is computed as per Equation [39].

Solving for r using Equations [33] and [34], $$r = \frac{g_w + \sqrt{g_w^2 + 4f_s g^2 + 4f_s' d^2}}{2}, \qquad [41]$$

where $$g_w = \sqrt{\frac{m}{w}}$$

and g is computed by solving Equation (17) in Appendix A or any other method mentioned in various embodiments. Pd'=Diag(Pd/r) and g'û are quantized and sent to decoder and scaling ensures that the unquantized and scaled decorrelation and prediction parameters are within the desired range.

The final decoded/upmixed output is given as:

$$[W'' \; Y'' \; X'' \; Z'']^T = \text{Upmix} * [W' \; D1(W') \; D2(W') \; D3(W')]^T, \qquad [42]$$

-continued where, $$\mathrm{Upmix}_{[4\times 4]}=\begin{pmatrix} x1_{[1\times 1]} & x2_{[1\times 3]} \\ x3_{[3\times 1]} & x4_{[3\times 3]} \end{pmatrix}, \quad [43]$$

where $x1_{[1\times 1]}=(1-fg'^2-f'd'^2)$, $x2_{[1\times 3]}=0$, $x3_{[3\times 1]}=g'\hat{u}$, and $x4_{[3\times 3]}=\mathrm{diag}(Pd')$, W' is the post predicted and scaled downmix channel, D1(W'), D2(W') and D3(W') are decorrelated outputs of W' and W", Y", X", Z" are decoded FoA channels.

2.3.1.5 Passive Downmix Coding with Scaling

In the passive downmix method there is the problematic issue that 'g', e.g. the vector of prediction parameters may be unbounded. This results in spatial distortions with parametric upmix configurations. At low bitrates, the number of downmix channels can be less than 4 and the remaining channels are parametrically upmixed at the decoder. Upon quantization 'g' gets bounded which leads to imperfect prediction estimates and the upmix relies on more decorrelator energy to parametrically regenerate the Y, X or Z channels. The problem is addressed by a modified passive scheme described below that applies dynamic scaling to the W channel during the downmix process. The scaling is calculated such that 'g' never goes out of bound, and during the parametric upmix more energy is derived from the available representation of W channel instead of the decorrelated signals, Below is an example implementation of a scaled passive downmix coding scheme with 1-channel downmix, FoA input is given by $U=[W\ X\ Y\ Z]^T$. The input signal (4×4) covariance matrix: $R=UU^T$. In default passive scheme prediction parameters are computed as $$p=\frac{WU^T}{WW^T},$$

where $p=[1\ p_1\ p_2\ p_3]^T$. The downmix prediction matrix is given as:

$$Pred_{[4\times 4]}=\begin{pmatrix} 1 & 0 \\ -g'\hat{u} & I_3 \end{pmatrix}, \quad [44]$$

where $g=\sqrt{p_1{}^2+p_2{}^2+p_2{}^3}$, and $g\hat{u}=[p_1,\ p_2,\ p_3]^T$, prediction parameters transmitted to decoder are quantized $p_1$, $p_2$, $p_3$. The inverse prediction upmix in passive coding scheme is given as:

$$InvPred_{[4\times 4]}=\begin{pmatrix} 1 & 0 \\ g'\hat{u} & I_3 \end{pmatrix}. \quad [45]$$

With scaling, downmix prediction matrix is changed to:

$$Pred_{[4\times 4]}=\begin{pmatrix} r & 0 \\ -g'\hat{u} & I_3 \end{pmatrix}, \quad [46]$$

where $g'=g/r$ and r is the scaling factor, and the inverse prediction upmix matrix is changed to:

$$InvPred_{[4\times 4]}=\begin{pmatrix} (1-f_s g'^2) & 0 \\ g'\hat{u} & I_3 \end{pmatrix}. \quad [47]$$

where $f_s$ is a constant (e. g., 0.5).

Putting these values in Equations [33] and [34] and equating $out_{cov}(1, 1)=W$, gives:

$$1=r^2\left(1-f_s\left(\frac{g}{r}\right)^2\right)^2, \quad [48]$$

where solving for r gives:

$$r=\frac{g_w+\sqrt{g_w^2+4f_s g^2}}{2},\ \text{where } g_w=1. \quad [49]$$

With scaled passive downmix scheme, prediction parameters transmitted to decoder are quantized p1/r, p2/r, p3/r. Since scaling factor 'r' is a function of prediction parameters, it boosts the energy in W enough to makes sure that prediction parameters are within the desired range. Scaling factor 'r' may be banded or a broadband value.

In some implementations, scaling factor 'r' can be a function of both prediction parameters and decorrelation parameters as shown in Equation [41]. For passive downmix this scaling factor comes to be:

$$r=\frac{g_w+\sqrt{g_w^2+4f_s g^2+4f_s' d^2}}{2},\ \text{where } g_w=1. \quad [50]$$

2.3.1.6 Adaptive Downmix Coding with Scaling

It is observed that scaled active W downmix coding method works best in conditions when there is high correlation between the W and X, Y, Z channels while the scaled passive W downmix coding method works best when the correlation is low. Hence, in some implementations, a more robust solution can be derived by appropriately switching between scaled passive and active W coding schemes.

In an embodiment, the active W downmix coding method can either be based on the solutions described in section 2.3.1.2, or as per the active W downmix coding method described in Appendix A. The scaling of the active W downmix coding method be performed in accordance with the solution described in section 2.3.1.4, and the scaling of passive W downmix coding method can be performed in accordance with the solution described in section 2.3.1.5. An example implementation of adaptive downmix with scaling is described below.

FoA input is given by $U=[W\ X\ Y\ Z]^T$. The input signal (4×4) covariance matrix: $R=UU^T$. Compute a passive prediction coefficient factor $g_{pred}$, where $g_{pred}=\sqrt{p_1{}^2+p_2{}^2+p_3{}^2}$, where $p_1$, $p_2$ and $p_3$ area calculated as follows:

$$p=\frac{WU^T}{WW^T},\ \text{where } p=[1\ \ p_1\ \ p_2\ \ p_3\ ]^T. \quad [51]$$

If $g_{pred} \geq$ thresh, then compute active W prediction parameters g'û, scaling factor 'r', prediction matrix, inverse prediction matrix, downmix and upmix matrices as per Equations [31] to Equation [41] in section 2.3.1.4.

If $g_{pred} <$ thresh, then compute passive W prediction parameters g'û, scaling factor 'r', prediction matrix, inverse prediction matrix, downmix and upmix matrices as per Equations [44] to Equation [50] in section 2.3.1.5.

Since, the inverse prediction matrix on the decoder side is same for scaled passive and active W downmix coding methods as given in Equation [31] and Equation [47], no additional side information is required to signal whether the downmix is coded with scaled active or passive W downmix coding methods. Another approach is based on a maximum scale factor r, as described in section 2.3.1.7.

Softly Switching between Scaled Passive and Active Downmix

In this embodiment, a scaled version of the W signal (e.g., no contributions from Y, X, Z signals) is used as the downmix in the active downmix coding method as long as the required scaling factor r does not exceed an upper limit. The adaptive scaling pushes prediction and decorrelator parameters into a good range for quantization, and not mixing Y, X, Z signal contributions into the downmix can avoid artifacts for some types of signals. On the other hand, large variations of the downmix scale factor r can lead to artifacts as well. Therefore, if the maximum scale factor per frequency band exceeds an upper limit (e.g., typically 2.5), then the example iterative process described below can be used to determine downmix coefficients with contributions from Y, X, Z signals, such that the scaling factor r is within the maximum limit. Compared to the original active W algorithm, the additional scale factor r allows for optimal prediction coefficients.

The example iterative process referenced above is described as follows:

1. define downmix coefficients: A=[1 0 0 0],
2. compute prediction parameters using $$p = \frac{WU^T}{WW^T},$$

3 compute decorrelator parameters using $$d = sqrt\left(\frac{E_p}{WW^T}\right),$$

Ep computed as per Equation [19], 4. compute downmix scale factor using $r=r_1$ from Equation [49],
5. scale prediction and decorrelator parameters by 1/r, scale downmix as W'=r*W
6. define unit vector $U=[p_1\ p_2\ p_3]/\sqrt{p_1^2+p_2^2+p_3^2}$,
7. define unit vector scaling h=0.1 and maximum scaling factor r_max=2.5,
8. while (r>r_max && h<=0.5)
   a. define downmix coefficients A=[1 hU],
   b. Compute primary downmix channel M without scaling,
   c. compute prediction parameters using $$p = \frac{MU^T}{MM^T},$$

d. compute decorrelator parameters using $$d = sqrt\left(\frac{E_p}{MM^T}\right),$$

e. compute downmix scale factor using $r=r_i$ from Equation [37],
   f. scale prediction and decorrelator parameters by 1/r, scale downmix as W'=r*M and
   g. increment unit vector scaling: h=h+0.1

2.3.1.8 Active Downmix Coding Scheme Based on Eigensignal

For this embodiment, the terminology is defined as follows: the input signal to encoder=$[W\ X\ Y\ Z]^T$, the encoder signal to be passed on to the EVS encoder=$[W'\ X'\ Y'\ Z']^T$ (some channels may be discarded prior to EVS encoding), the EVS decoder output prior to the prediction set in the decoder=$[W''\ X''\ Y''\ Z'']^T$ (if the encoder discarded some channels, then only a subset of this vector will exist) and the output from decoder=$[W_{out}X_{out}Y_{out}Z_{out}]^T$.

If we assume that the IVAS "core coder" works by discarding channels X', Y', Z' and EVS coding the W' channel, then:

$$\begin{pmatrix} W'' \\ X'' \\ Y'' \\ Z'' \end{pmatrix} = \begin{pmatrix} Dec_{EVS}(Enc_{EVS}(W')) \\ 0 \\ 0 \\ 0 \end{pmatrix}. \quad [52]$$

If there is complete freedom over the parameters used in the decoder for generating the output signals from W, then, in an embodiment, a least-squares optimal solution is found by implementing a Kanade-Lucas-Tomasi (KLT)-type E1 coder. In an alternative embodiment, the goal of the active W prediction system is stated as: add some constraints to the KLT method to reduce the discontinuity problems that often arise and keep the constraints to a minimum to come as close as possible to the optimal performance that is achieved by the KLT method.

The prediction methods (both passive and active) are generally based on the notion that the downmix signal (W') should have a reasonably large positive correlation to the original W signal. A potential method for achieving this is to apply the KLT method to a boosted-W channel set (e.g., a set of 4 channels where the W channel has been amplified by a scale factor h), referred to hereinafter as the "boosted-KLT" method. Let the vector T represent this boosted-W signal:

$$T = \begin{pmatrix} hW \\ X \\ Y \\ Z \end{pmatrix}, \quad [53]$$

and let Q be the largest eigenvector of $T \times T^+$:

$$Q = \begin{pmatrix} q_0 \\ q_1 \\ q_2 \\ q_3 \end{pmatrix} \text{ where: } \sum_i q_i^2 = 1, \quad [54]$$

where the eigenvector is chosen so that $q_0 \in \mathbb{R}$ and $q_0 >= 0$ (thus ensuring that our downmix signal will be positively correlated with W, if possible).

Note that the fact that the need to choose an eigenvector from a set of candidates stems from the fact that, if Q is an eigenvector, then so too is λQ, where λ is any unity-magnitude complex scale-factor, and the choice is made by choosing a value for λ that makes $q_0$ a non-negative real quantity. The act of choosing λ can be a source of discontinuity in the behaviour of the codec, and this erratic behavior can be avoided by ensuring that $q_0$ is not close to zero, and making the boost-factor, h, large, so that the boosted hW signal is large enough to form a significant component of the E1 signal.

E1 is formed as:

$$E1=Q^T\times T=hq_0W+q_1X+q_2Y+q_3Z. \quad [55]$$

In the decoder, the least-squares best estimate of T is reconstructed using the eigenvector Q and the output can then be formed by undoing the boost-gain h:

$$T''=Q\times E1 \text{ and so:} \quad [56]$$

$$\begin{pmatrix} W_{out} \\ X_{out} \\ Y_{out} \\ Z_{out} \end{pmatrix} = \begin{pmatrix} \frac{1}{h} & 0 & 0 & 0 \\ 0 & 1 & 0 & 0 \\ 0 & 0 & 1 & 0 \\ 0 & 0 & 0 & 1 \end{pmatrix} \times Q \times E1 = \begin{pmatrix} \frac{1}{h}q_0 \\ q_1 \\ q_2 \\ q_3 \end{pmatrix} \times E1.$$

However, Equation [56] can be implemented by using the transmitted prediction parameters ($p_1$, $p_2$ and $p_3$) and the constant $f_s$, by applying a scale-factor, r, to E1 (this scale factor will be applied in the encoder):

$$\begin{pmatrix} W_{out} \\ X_{out} \\ Y_{out} \\ Z_{out} \end{pmatrix} = \begin{pmatrix} 1-f_s(p_1^2+p_2^2+p_3^2) \\ p_1 \\ p_2 \\ p_3 \end{pmatrix} \times E1 \times r. \quad [57]$$

The desired "boosted-KLT" behavior of Equation [56] can be achieved by the method of Equation [57] if r is chosen according to:

$$r=\frac{q_0+\sqrt{4f_sh^2(1-q_0^2)+q_0^2}}{2h}, \quad [58]$$

and then compute:

$$p_1=\frac{q_1}{r},\ p_2=\frac{q_2}{r} \text{ and } p_3=\frac{q_3}{r}.$$

The embodiment described above is summarized as follows.

Encode Step 1:

Given the Covariance of the input signals $Cov_U$, use the diagonal terms ($W^2$, $X^2$, $Y^2$ and $Z^2$) to determine $$h=\sqrt{\frac{X^2+Y^2+Z^2}{W^2}}$$

(but limiting h to the range 1≤h<10).

Encode Step 2:

Form the covariance of the boosted-W signal: $Cov_T=\text{diag}[h,1,1,1]\times Cov_U\times\text{diag}[h,1,1,1]$.

Encode Step 3:

Determine the dominant eigenvector: $Q=[q_0, q_2, q_3]^T$, such that $q_0\in\mathbb{R}$ and $q_0\geq 0$.

Encode Step 4:

Assuming f=½, compute $$r=\frac{q_0+\sqrt{4f_sh^2(1-q_0^2)+q_0^2}}{2h},$$

and hence compute the decoder prediction parameters:

$$p_1=\frac{q_1}{r},\ p_2=\frac{q_2}{r},\ p_3=\frac{q_3}{r}.$$

Encode Step 5:

From the downmix signal $W'=r(hq_0W+q_1X+q_2Y+q_3Z)$.

Encode Step 6:

Determine the decorrelation gain coefficients $d_1$, $d_2$, and $d_3$ as per Equation [39]

Decode:

Given the EVS output W", assuming $f_s$=½, and given the metadata $\{p_i: i=1 \ldots 3\}$, compute the output signals:

$$W_{out}=W''(1-f_s(p_1^2+p_2^2+p_3^2)), \quad [59]$$

$$X_{out}=p_1W''+d_1D_1(W''),$$

$$Y_{out}=p_2W''+d_2D_2(W'')$$

$$Z_{out}=p_3W''+d_3D_3(W'').$$

2.3.1.9 Scaled Active Downmix Coding Scheme Based on Pre-scaling of W Channel

While creating a representation of the dominant eigen signal with active prediction (i.e., mixing components from X, Y and Z into W), one of the challenges is to get a smooth/continuous representation of the dominant eigen signal across the frequency spectrum and across frame boundaries in the time domain. While the previously described active prediction approaches try to solve this problem, there are still some cases where the amount of rotation (or mixing) from X, Y and Z channel into W is either too aggressive, which causes discontinuities (or other audio artefacts) or no rotation at all (passive prediction), which fails to give optimum prediction and relies more on decorrelators to fill the unpredicted energy. Accordingly, the approaches described above may provide prediction that is too aggressive or too weak. In an embodiment, W is scaled prior to performing active prediction. The idea behind this embodiment is that pre-scaling of the W channel would ensure that the post active prediction W channel (or the representation of dominant eigen signal) comprises most of original W. This means that the amount of X, Y and Z to be mixed with W is reduced, and therefore results in a less aggressive active prediction as compared to the solution described in Appendix A, while still resulting in stronger prediction as compared to the passive (or scaled passive) approaches described above. The amount of pre-scaling is determined as a function of variance of W and X, Y, Z channels such that W becomes close to the dominant energy signal before doing active prediction.

Below is an example implementation of pre-scaled W active prediction downmix coding scheme with 1 channel downmix. Let the FoA input be given as U=[W X Y Z]$^T$, and the input signal (4×4) covariance matrix give as:

$$in_{cov[4X4]} = UU^T = \begin{pmatrix} w & \alpha\hat{u}^* \\ \alpha\hat{u} & R \end{pmatrix}, \quad [60]$$

where û is 3×1 unit vector and R is a 3×3 covariance matrix of X, Y and Z channels, and w is the variance of the W channel.

Now pre-scale the W channel prior to doing active prediction. The pre-scaling factor "h" is a function of variance of X, Y, Z and W and is computed as follows:

$$h = \max\left(1, \min\left(Hmax, \sqrt{\frac{\text{trace}(R)}{w}}\right)\right), \quad [61]$$

where h is the prescaling factor, Hmax is a constant (e.g., 4) that puts an upper bound on prescaling.

Pre-scaling, matrix is given as:

$$Hscale_{[4\times4]} = \begin{pmatrix} h & 0 \\ 0 & I_3 \end{pmatrix}. \quad [62]$$

Next, compute active prediction parameters based on scaled covariance matrix given below scale_cov$_{[}$4×4]= Hscale*in_cov*Hscale' and solve for "g" based on the scaled input covariance results in cubic(g) as follows (refer to Equation (17) in Appendix A):

$$\text{cubic}(g)=(\beta f^2)g^3+(2fh\alpha)g^2+(h^2w-\beta f)g-(h\alpha). \quad [63]$$

Alternatively, one can solve for g and f as follows refer to Equation (24) in Appendix A:

$$\text{if } \frac{\alpha}{hw} \le g' \text{ then } g = \frac{\alpha}{hw},$$

else fix g=g'and solve for f, then $$\text{quadratic}(g)=(\beta g'^3)f^2+(2g'^2h\alpha-\beta g')f+(h^2wg'-h\alpha), \quad [64]$$

$$f = \frac{(\beta - 2\alpha hg') + \sqrt{(4\alpha^2h^2g'^2 + \beta^2 - 4\beta g'^2wh^2)}}{2\beta g'^2}, \quad [65]$$

or $$f = \frac{(\beta - 2\alpha hg') + \sqrt{((\beta - 2\alpha hg')^2 + 4\beta g'h(\alpha - g'wh))}}{2\beta g'^2} \quad [66]$$

Since 4βg'h(α−g'wh)<0, as ⟹g'wh f can be written as:

$$f = \frac{(\beta - 2\alpha hg') + \text{abs}(\beta - 2\alpha hg') + C}{2\beta g'^2}, \quad [67]$$

where C is a positive constant and noting that (β−2αhg')+ abs(β—2αhg') will either be 0 or always decrease as he increases.

It is also known that C decreases if 4βg'h(α−g'wh) decreases 4βg'h(α−g'wh) decreases ash increases if α<g'w (2h+δ), where δ is the increment in value of h.

Hence, the overall value of "f" should decrease with increase in value of "h" unless input covariance is too high in which case controlling X, Y, Z mixing into W may not be required anyway.

Now, with pre-prediction scaling "h" and post-prediction scaling "r", the prediction matrix is computed as follows:

$$\text{Pred}_{[1\times4]}=(hr\ rfg\hat{u}^*) \quad [68]$$

This results in post prediction W signal as:

$$W'=(h^*W+p_1fY+p_2fX+p_3fZ)^*r, \quad [69]$$

where gû (or [$p_1$, $p_2$, $p_3$]) is a 3×1 vector that represents the prediction parameters, r is the scaling factor to scale post predicted W, such that energy of upmixed W is the same as the input W.

The computation of post prediction scaling factor "r" is same as given in section 2.3.1.4, Equation [37]:

$$r = \frac{g_w + \sqrt{g_w^2 + 4f_sg^2}}{2}, \text{ where } g_w\sqrt{\frac{w}{m}}, \quad [70]$$

and g is computed by solving Equation (17) in Appendix A.

Now, the scaled prediction parameters are computed as:

$$g'=g/r, \text{ where } g'\hat{u} \text{ (or } [p1'\ p2'\ p3']) \quad [71]$$

Decorrelation Parameters

In an embodiment, the downmixed (or post predicted) W channel variance is given by:

$$m=\text{Pred}_{[1\times4]}{}^*\text{in}_{cov_{[4\times4]}}{}^*\text{Pred}'_{[4\times1]}. \quad [72]$$

Decorrelation parameters are computed as normalized uncorrelated (or unpredictable) energy in Y, X and Z channels with respect to the post predicted W channel. In an example implementation, decorrelation parameters (Pd parameters) with a pre-scaled W active downmix coding scheme can be computed from a scaled covariance scaled as per Equation [62] and an active downmix matrix given as $$Dmx_{[4\times4]} = \begin{pmatrix} r & rfg\hat{u}^* \\ -g\hat{u} & I_3 - g^2\hat{u}\hat{u}^* \end{pmatrix}, \quad [73]$$

$$PostP = Dmx_{[4\times4]} * \text{scale\_cov}_{[4\times4]} * Dmx'_{[4\times4]}, \quad [74]$$

$$Res_{[3\times3]} = Postp(2{:}4, 2{:}4), \quad [75]$$

$$NRes_{[3x3]} = \frac{Res_{[3\times3]}}{\max(\varepsilon, m, \text{scale}_{*tr}(|Res_{[3\times3]}|))}, \quad [76]$$

$$Pd_{[3\times1]} = \text{diag}\left(\sqrt{\max(0, \text{real}\ (\text{diag}(NRes_{[3\times3]})))}\right). \quad [77]$$

Here, Equation [77] gives the decorrelation parameters (3×1 Pd matrix or d1, $d_2$ and $d_3$ parameters) to be encoded and sent to decoder. And "m" is the variance given in Equation [72], scale is a constant between 0 and 1.

Decoder

In an embodiment, decoder receives coded W' PCM channel (given by Equation [69]), coded prediction parameters (given by Equation [71]) and coded decorrelation parameters (given by Equation [77]). The mono channel decoder (e.g., EVS) decodes the W' channel (e.g., let the decoded channel be W"), the SPAR decoder then applies an inverse prediction matrix to the W" channel to reconstruct a representation of the original W channel and the elements of X, Y and Z that can be predicted from the W" channel.

In an embodiment, the inverse prediction matrix is given as follows (refer to Equation (8) in Appendix A):

$$InvPred_{[4\times4]} = \begin{pmatrix} (1 - f_s g'^2) & 0 \\ g'\hat{u} & I_3 \end{pmatrix}. \quad [78]$$

SPAR applies inverse prediction matrix and decorrelation parameters to reconstruct a representation of original FoA signal, where reconstruction of the FoA signal is given as follows:

$$W_{out}=W''(1-f_s g'^2), \quad [79]$$

$$X_{out}=p_1'W''+d_1 D_1(W''), \quad [80]$$

$$Y_{out}=p_2'W''+d_2 D_2(W'') \text{ and} \quad [81]$$

$$Z_{out}=p_3'W''+d_3 D_3(W'').$$

Here, $d_1$, $d_2$ and $d_3$ are decorrelation parameters and $D_1(W'')$, $D_2(W'')$, $D_3(W'')$, are three decorrelated channels with respect to W" channel.

2.3.1.10 Scaled Active Downmix Scheme Based on Normalized Covariance

Another embodiment to create a representation of the dominant eigen signal is by rotating the FoA input as a function of the normalized covariance of WX, WY, and WZ channels. This embodiment ensures that only the correlated components in the X, Y and Z channels are mixed into the W channel, thereby reducing the artifacts that may arise due to aggressive rotation (or mixing) by the previously described methods, especially when dealing with parametric upmix as there is no way to undo an imperfect mixing of X, Y, Z into W at the decoder side. Another benefit of this approach is that it simplifies the calculation of 'g' (active prediction coefficient factor) resulting in a linear equation in 'g'.

Below is an example implementation of active prediction downmix coding with 1 channel downmix where a representation of dominant eigen signal is formed by performing a rotation (that is a function of normalized covariance factor) to the input FoA signal.

Let the FoA input be given as $U=[W\ X\ Y\ Z]^T$ and the input signal (4×4) covariance matrix:

$$in_{cov_{[4\times4]}} = UU^T = \begin{pmatrix} w & \alpha\hat{u}^* \\ \alpha\hat{u} & R \end{pmatrix}, \quad [82]$$

where û is a 3×1 unit vector and R is 3×3 covariance matrix between the X, Y and Z channels and w is the variance of the W channel.

Let "F" be a function of normalized "α" that gives the amount of mixing to be done from X, Y, Z into W channel to form a representation of the dominant eigen signal. The active prediction matrix can then be given as follows (refer to Equation (6) in Appendix A):

$$Pred_{[4\times4]} = \begin{pmatrix} 1 & F\hat{u}^* \\ -g\hat{u} & I_3 - \hat{u}\hat{u}^* \end{pmatrix}, \quad [83]$$

-continued $$\text{where } F = \min\left(1, \frac{f\alpha}{\max\left(mw, \frac{\text{trace }(R)}{1}\right)}\right).$$

In an embodiment, the normalization term in the calculation of "F" is chosen such that it results in optimum mixing of X, Y, Z into W even in corner cases when energy in W is too low or too high as compared to the X, Y and Z channels.

In Equation [83], "f" and "in" are constants such f<=1 and m>=1 (e.g., f=0.5 and m=3), it may be desired to have a lower value of F when the W variance is already high as compared to X, Y and Z channel variances, and hence the factor "m" helps with achieving the desired normalization in such cases.

In an embodiment, the post prediction matrix after applying the prediction matrix in Equation [83] to the input is given as:

$$\text{Post\_prediction}_{[4\times4]} = Pred * \text{in\_cov} * Pred' \quad [84]$$

$$\text{Post\_prediction}_{[4\times4]} = \begin{pmatrix} m & \hat{r}^* \\ \hat{r} & Res \end{pmatrix},$$

where r̂ is minimized by setting û*×r̂=0 as per Equation (12) in Appendix A. This results in a linear equation in g:

$$\text{linear }(g) = g\beta F^2 + 2\alpha gF + wg - \beta F - \alpha, \quad [85]$$

$$g = \frac{\alpha + \beta F}{\beta F^2 + 2\alpha F + w}.$$

If there is no rotation (i.e., F=0), then g=α/w, which is the same as the passive prediction coefficient factor.

When correlation between the W and the X, Y, Z channels is very' low, such that is a≈0, then the result is F≈0 which means zero (or close to 0) amount of mixing is to be done from X, Y, and Z into W. Inversely, when there is high correlation between the W and X, Y, Z channels and the variance of W is lower than X, Y and Z channels then that would result in high value of F as desired. Post active prediction, it may still be desired to do scaling on the post predicted W to ensure that the variance of the upmixed W is same as the input W, and also to ensure that the prediction parameters are in desired range.

In an embodiment, the actual prediction matrix for a 1-channel downmix, post scaling, is given as:

$$\text{Pred}_{[1\times4]}=(r\ \ rF\hat{u}^*), \quad [86]$$

where r is the post prediction scaling factor.

This results in the post prediction W' signal:

$$W'=(W+Fu_1Y+Fu_2X+Fu_3Z)*r, \quad [87]$$

where F is given in Equation [83], $(u_1, u_2, u_3)$ is a unit vector given by û in Equation [82].

The computation of the post prediction scaling factor "r" is same as given in section 2.3.1.4 Equation (37) by using the inverse prediction matrix given in Equation [31] and prediction matrix given in Equation [86] and substituting them in Equation [33] and Equation [34]:

$$r = \frac{g_w + \sqrt{g_w^2 + 4f_s g^2}}{2}, \ g_w = \sqrt{\frac{w}{m}}, \quad [88]$$

where m is the post predicted W variance with r=1 as per Equation [33].

The scaled prediction parameters are given by:

$$g'=g/r, \tag{89}$$

and g'û (or $[p_1, p_2, p_3]$) is a 3×1 prediction parameters vector to be encoded and sent to the decoder.

Decorrelation Parameters

From Equations [82] and [86], the downmixed (or post predicted) W channel variance is given by:

$$m'=\mathrm{Pred}_{[1\times4]}*\mathrm{in}_{cov[4\times4]}*\mathrm{Pred}'_{[4\times1]}. \tag{90}$$

In an embodiment, decorrelation parameters are computed as normalized uncorrelated (or unpredictable) energy in Y, X and Z channel with respect to post predicted W channel.

In an embodiment, the decorrelation parameters (Pd parameters) can be computed from $\mathrm{Post\_prediction}_{[4\times4]}$ computed in Equation [84]:

$$Res_{[3\times3]} = \mathrm{Post\_prediction}(2{:}4,\ 2{:}4) \tag{91}$$

$$NRes_{[3\times3]} = \frac{Res_{[3\times3]}}{\max(\varepsilon,\ m',\ \mathrm{scale} * tr(|Res_{[3\times3]}|))}. \tag{92}$$

$$Pd_{[3\times1]} = \mathrm{diag}\left(\sqrt{\max(0,\ \mathrm{real}\ (\mathrm{diag}(NRes_{[3\times3]})))}\right). \tag{93}$$

Here, Equation [93] gives the decorrelation parameters (3×1 Pd matrix or d1, $d_2$ and $d_3$ parameters) to be encoded and sent to decoder. And "m'" is the variance given in Equation [90], "scale" is a constant between 0 and 1.

Decoder

In an embodiment, the decoder receives the coded W' PCM channel (given by Equation [87]), coded prediction parameters (given by Equation [89]) and the coded decorrelation parameters (given by Equation [93]).

In an embodiment, the mono channel decoder (e.g., EVS) decodes the W' channel (let the decoded channel be W"), and the SPAR decoder then applies an inverse prediction matrix to the W" channel to reconstruct a representation of the original W channel and the elements of X, Y and Z that can be predicted from the W" channel, Inverse prediction matrix is same as in Equation [31]:

$$InvPred_{[4\times4]} = \begin{pmatrix} (1 - f_s g'^2) & 0 \\ g'\hat{u} & I_3 \end{pmatrix}. \tag{94}$$

In an embodiment, SPAR applies the inverse prediction matrix and decorrelation parameters to reconstruct a representation of the original FoA signal, where the reconstruction of FOA signal is given as follows:

$$W_{out}=W''(1-f_s g'^2), \tag{95}$$

$$X_{out}=p_1'W''+d_1D_1(W''), \tag{96}$$

$$Y_{out}=p_2'W''+d_2D_2(W'')\ \text{and} \tag{97}$$

$$Z_{out}=p_3'W''+d_3D_3(W''). \tag{98}$$

Here, d1, $d_2$ and $d_3$ are decorrelation parameters and $D_1$(W"), $D_2$(W"), $D_3$(W"), are three decorrelated channels with respect to the W" channel.

2.3.2 Passive Downmix Coding Scheme

In the passive downmix coding scheme, any downmix can be chosen for transmission which enables the best possible reconstruction of the FoA signals using N (e.g., N=3) prediction parameters and M (e.g., M=3) decorrelator parameters. The original W is transmitted for the passive downmix coding scheme, e.g. no downmix operation is performed. The advantage of this approach is that the downmix signal is not prone to any instability issues which might be introduced by a signal adaptive downmix. The disadvantage is that the reconstruction (prediction) of FoA signals X, Y, Z is suboptimal. Therefore, different downmix strategies are described below which reduce the waveform reconstruction error of the FoA signals compared to transmitting W. In all cases, the FoA signals X,Y,Z are predicted by a single prediction parameter each and the downmix represents W. The downmix is scaled such that the energy of the downmix matches the energy of W. It is possible to apply the downmix strategies described below in the active downmix coding scheme as well.

2.3.2.1 Propose Adaptive Downmix Strategies 2.3.2.1.1 Smoothing

For all adaptive downmix strategies there is the risk to introduce temporal instabilities (artefacts) when the downmix coefficients or the scaling factor change to quickly (in time) or across frequency bands. Furthermore, if the downmixing is performed in a down-sampled filter bank domain, modifying the signals too drastically can increase aliasing distortion in the synthesis. Therefore, coefficients should change relatively smoothly over time and frequency. It is proposed to smooth downmix coefficients over time by a first order UR filter or a FIR filter. Smoothing over frequency bands can be done with a delay less moving average FIR filter.

Alternatively, the adaptive downmix may be a broadband downmix, e.g. the time frame adaptive downmix coefficients are identical for all frequency bands, while the prediction and decorrelator parameters are frequency band dependent.

2.3.2.1.2 Stabilized Eigensignal

In an embodiment, the dominant Eigensignal, which is derived from the Eigenvector with the highest eigenvalue based on the input Covariance R, is transmitted to the decoder. The problem with that is that the Eigensignal may be temporally unstable. This problem can be mitigated by transmitting a "boosted" Eigensignal with W being forced dominant (boosted before deriving the Eigenvector) according to Equation [55] in section 2.3.1.7, such that $A=[hq_0\ q_1\ q_2\ q_3]$ with additional energy (W) preserving scaling factor r.

2.3.2.1.3 Ad-Hoc Heuristic Downmix Rule

This approach is based on the observation, that the downmix should be correlated to some extent with the signals to predict. This is especially true if the target signal energy is large and thus perceptually important. Since we al low for negative valued prediction parameters, we should take care to coherently add downmix signals X,Y,Z to W (e.g. with the correct sign).

These considerations lead to the following downmix Rule (Matlab notation):

$$A = \mathrm{diag}(R)\ \mathrm{sign}\ (R)(:,\ 1))\left(1 - \frac{[0;\ |R(2{:}4,\ 1)|]}{sqrt(R(1,\ 1)\mathrm{diag}(R))}\right), \tag{99}$$

with energy scaling according to Equation [87]. In experiments, the total prediction error with this downmix strategy is significantly smaller than for the standard passive downmix.

2.3.2.1.4 Static Downmix Coefficients

Less prone to instability artefacts is an empirically derived downmix with fixed initial coefficients. One possible downmix could be:

$$A=[1\ 0.3\ 0.2\ 0.1].$$

Note that even though the coefficients are fixed, when scaling with respect to the energy of W, the downmix becomes adaptive.

2.3.2.1.5 Iterative Adjustment

This strategy iteratively reduces the total prediction error by adding contributions of signals to W which generate the largest prediction error according to Equation [86] measured per iteration. The quantization limitation of prediction parameters can be considered when calculating the total prediction error. In an embodiment, the following iterative processing is applied:

Initialize A=[1,0,0,0], Tuning constant k=0.2

Run iteration loop (few times like 1, 3 or 4)

Calculate the prediction error per signal $E_p$ per Equation [91]

Variant 1

Find signal (id) with highest prediction error

Increment downmix coefficient: A(id)=A(id)+k sign (R(id, 1))|A|

Variant 2 (increment all coefficients in one step per iteration)

$$A=A+k\ \mathrm{sign}(R(:,1))\sqrt{E_p}$$

Apply scaling to downmix coefficients (preserve W energy)

Calculate prediction parameters, Equation [84]

Limit prediction parameters to quantization range

Figure 3:
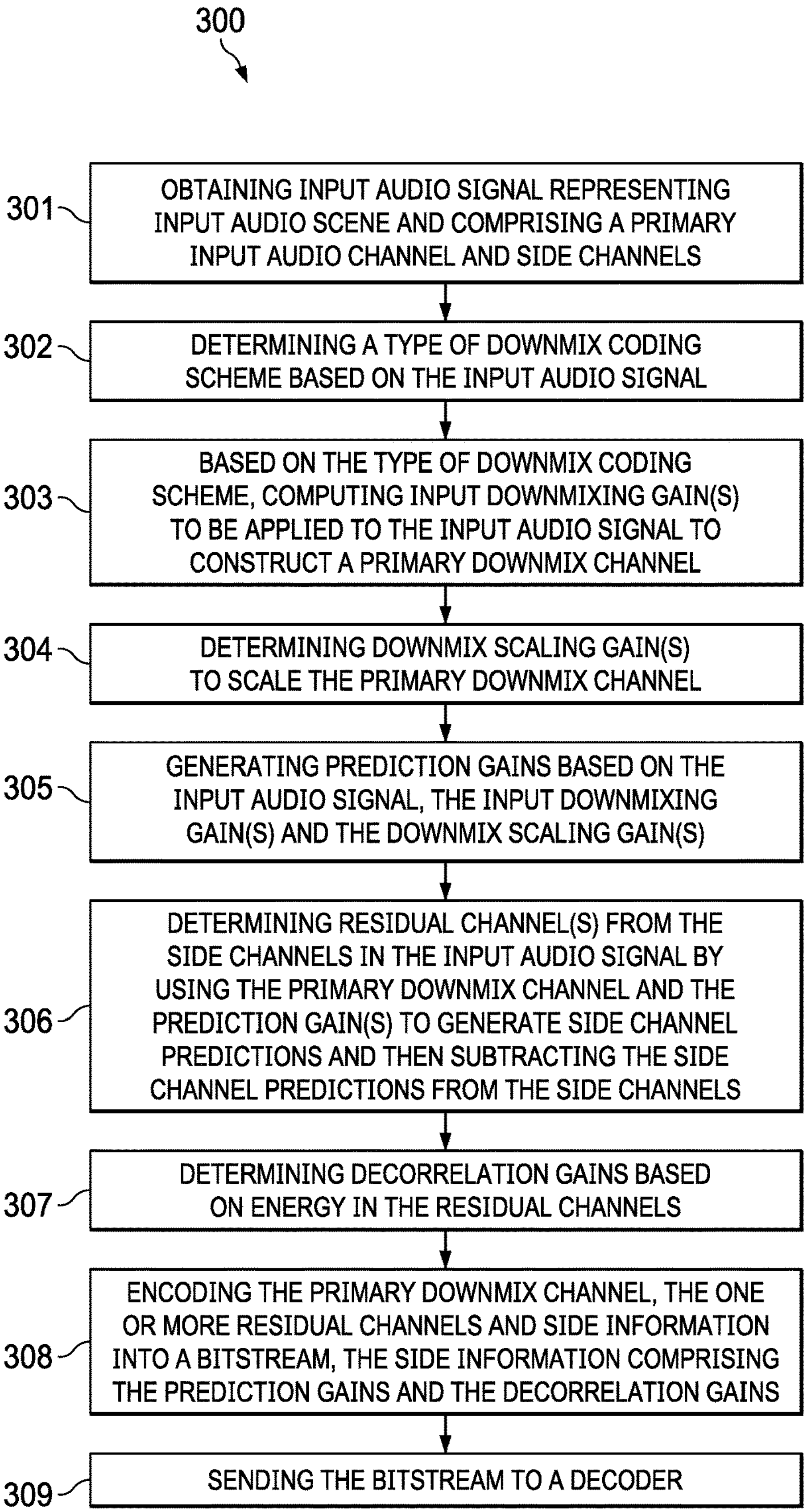
FIG. 3 is a flow diagram of a process of encoding audio, according to an embodiment.

FIG. 3 is a flow diagram of an audio signal encoding process 300 that uses an encoding downmix strategy applied at an encoder that is different than a decoding downmix strategy applied at a decoder. Process 300 can be implemented, for example, by system 700 as described in reference to FIG. 7.

Process 300 includes the steps of obtaining an input audio signal representing an input audio scene and comprising a primary input audio channel and side channels (301), determining a type of downmix coding scheme based on the input audio signal (302), based on the type of downmix coding scheme: computing one or more input downmixing gains to be applied to the input audio signal to construct a primary downmix channel (303), wherein the input downmixing gains are determined to minimize an overall prediction error on the side channels, determining one or more downmix scaling gains to scale the primary downmix channel (304), wherein the downmix scaling gains are determined by minimizing an energy difference between a reconstructed representation of the input audio scene from the primary downmix channel and the input audio signal, generating prediction gains based on the input audio signal, the input downmixing gains and the downmix scaling gains (305); determining one or more residual channels from the side channels in the input audio signal by using the primary downmix channel and the prediction gains to generate side channel predictions and then subtracting the side channel predictions from the side channels (306); determining decorrelation gains based on energy in the zero or more residual channels (307); encoding the primary downmix channel, the zero or more residual channels and side information into a bitstream, the side information comprising the prediction gains and the decorrelation gains (308); and sending the bitstream to a decoder (309). Each of these steps were described in detail in previous sections.

Figure 4A:
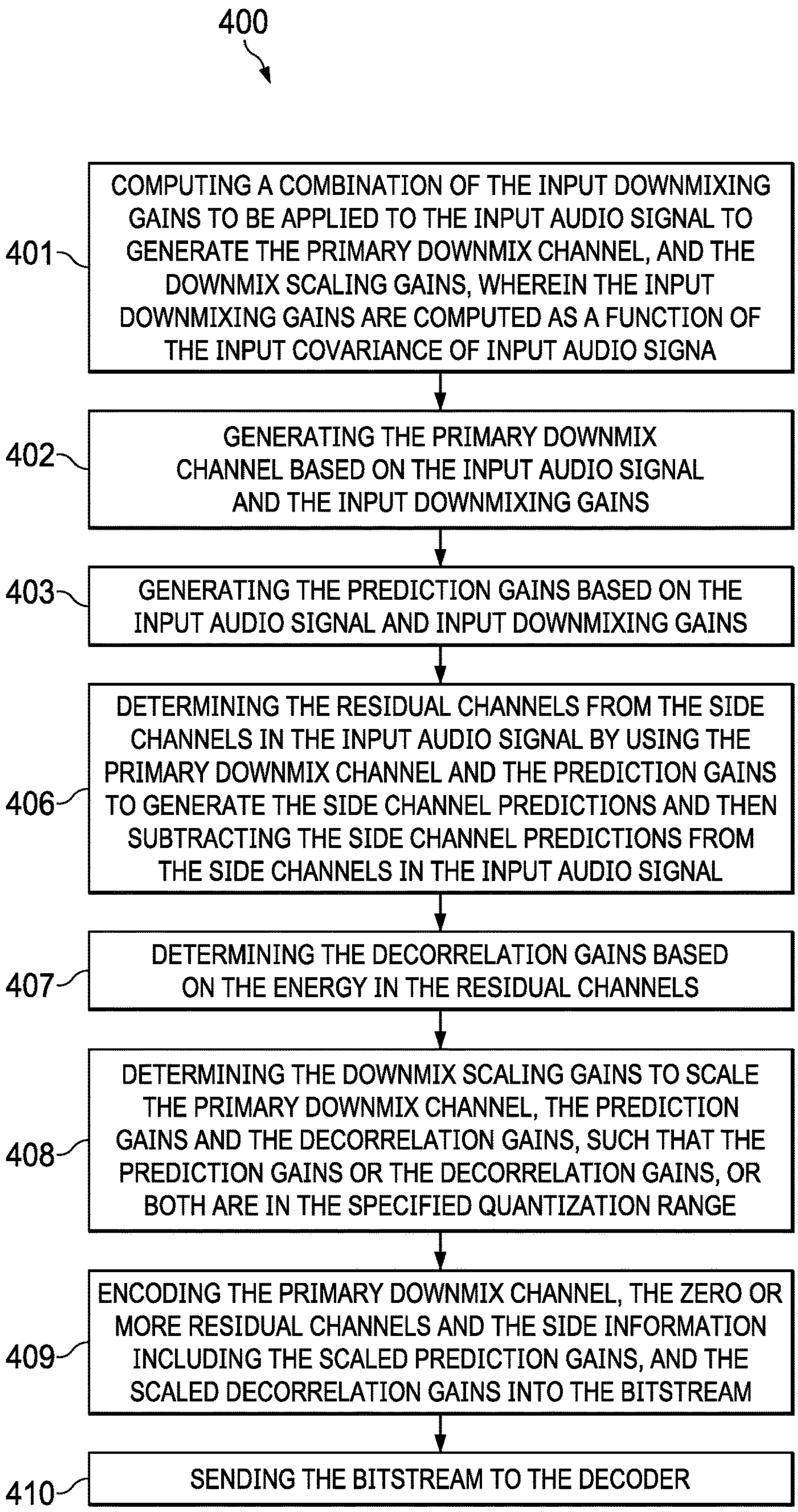
FIGS. 4A and 4B is a flow diagram of a process of encoding and decoding audio, according to an embodiment.
Figure 4B:
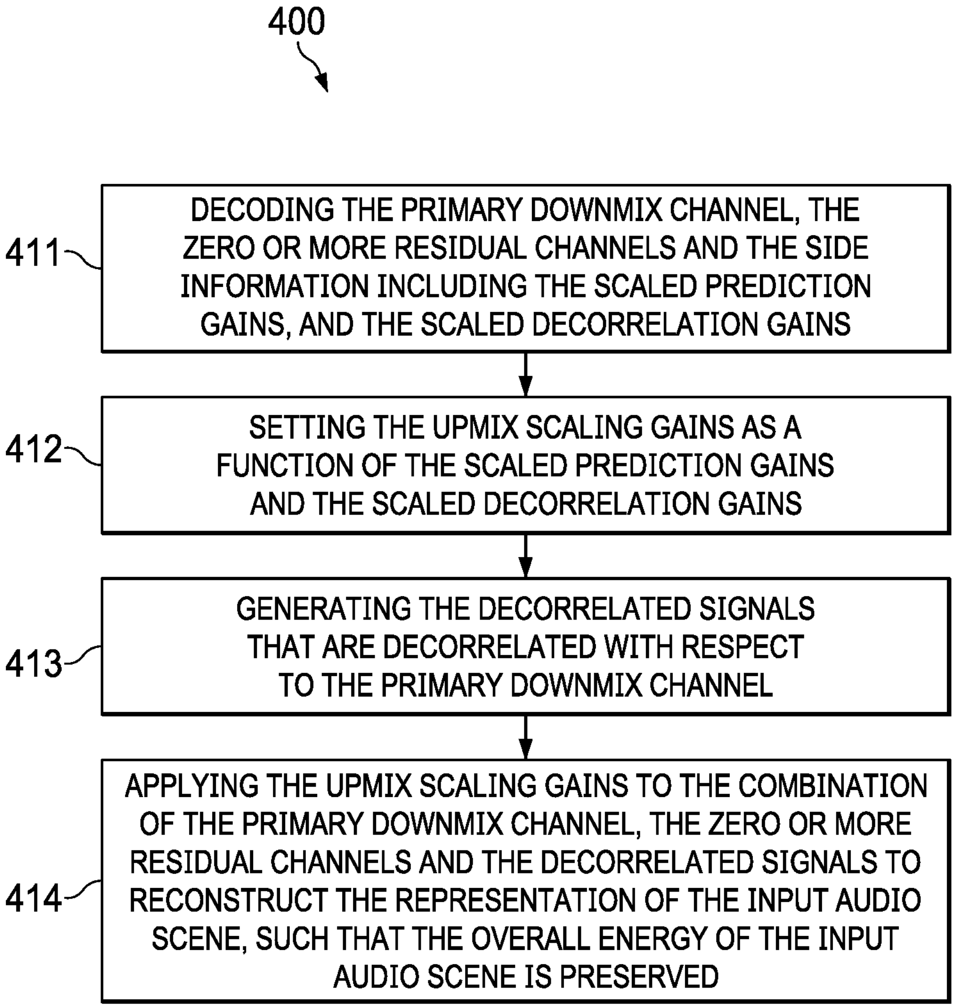

FIGS. 4A and 4B is a flow diagram of process 400 for encoding and decoding audio, according to an embodiment. Process 400 can be implemented, for example, by system 700 as described in reference to FIG. 7.

Referring to FIG. 4A, at an encoder, process 400 includes the steps of: computing a combination of the input downmixing gains to be applied to the input audio signal to generate the primary downmix channel, and the downmix scaling gains, wherein the input downmixing gains are computed as a function of the input covariance of input audio signal (401); generating the primary downmix channel based on the input audio signal and the input downmixing gains (402); generating the prediction gains based on the input audio signal and input downmixing gains (403); determining the residual channels from the side channels in the input audio signal by using the primary downmix channel and the prediction gains to generate the side channel predictions and then subtracting the side channel predictions from the side channels in the input audio signal (406); determining the decorrelation gains based on the energy in the residual channels (407); determining the downmix scaling gains to scale the primary downmix channel, the prediction gains and the decorrelation gains, such that the prediction gains or the decorrelation gains, or both are in the specified quantization range (408); encoding the primary downmix channel, the zero or more residual channels and the side information including the scaled prediction gains, and the scaled decorrelation gains into the bitstream (409); sending the bitstream to the decoder (410).

Referring to FIG. 4B, at the decoder, process 400 continues by decoding the primary downmix channel, the zero or more residual channels and the side information including the scaled prediction gains, and the scaled decorrelation gains (411); setting the upmix scaling gains as a function of the scaled prediction gains and the scaled decorrelation gains (412); generating the decorrelated signals that are decorrelated with respect to the primary downmix channel (413); and applying the upmix scaling gains to the combination of the primary downmix channel, the zero or more residual channels and the decorrelated signals to reconstruct the representation of the input audio scene, such that the overall energy of the input audio scene is preserved (414).

Figure 5:
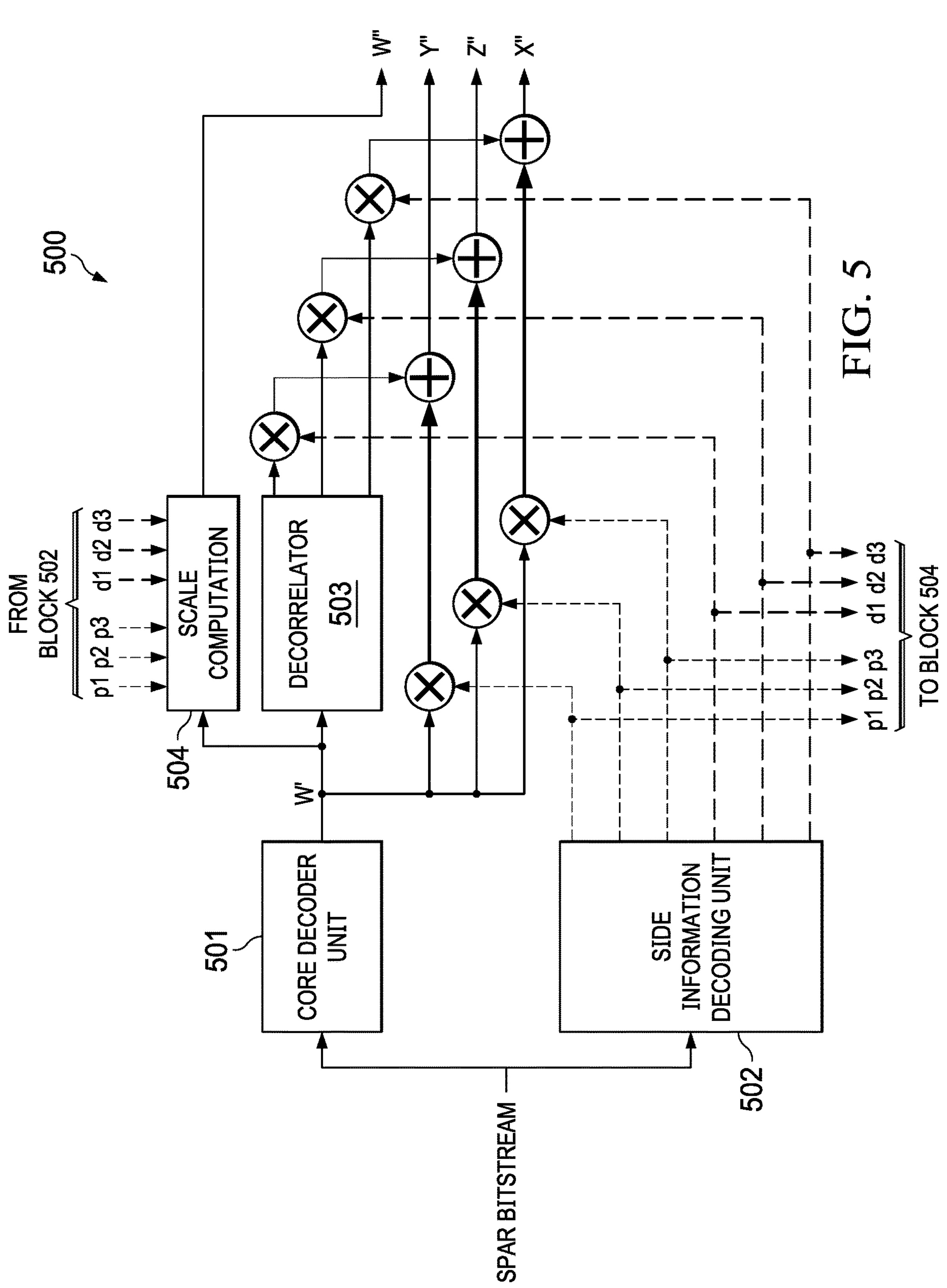
FIG. 5 is a block diagram of a SPAR FOA decoder operating in one channel downmix mode with adaptive downmix scheme, according to an embodiment.

FIG. 5 is a block diagram of a SPAR FOA decoder operating in one channel downmix mode with adaptive downmix scheme, according to an embodiment. SPAR decoder 500 takes a SPAR bitstream as input and reconstructs a representation of an input FoA signal at the decoder output, wherein the FoA input signal comprises a primary channel W and side channels Y, Z and X, and the decoded output is given by W'', Y'', Z'' and X'' channels. The SPAR bitstream is unpacked into core coding bits and side information bits. The core coding bits are sent to a core decoding unit 501 which reconstructs the primary downmix channel W'. The side information bits are sent to side information decoding unit 502 which decodes and inverse quantizes the side information bits, which comprises prediction gains ($p_1$, $p_2$, $p_3$) and decorrelation gains ($d_1$, $d_2$, $d_3$).

The primary downmix channel W' is fed to decorrelator unit 503 which generates 3 outputs that are decorrelated with respect to W. The Y, Z and X channel predictions are computed by scaling the W' channel with prediction gains ($p_1$, $p_2$ and $p_3$) and the remaining uncorrelated signal components of the Y, Z and X channels are computed by scaling decorrelated outputs of unit 503 with decorrelation gains ($d_1$, $d_2$ and $d_3$). The prediction components and decorrelated components are added together to obtain the output channels Y", Z" and X" at the output of decoder 500.

The primary channel downmix W' output of unit 501 and decoded side information output of unit 502 is fed to a scale computation unit 504 that computes the upmixing scaling gain to scale W' channel to obtain the W" channel, such that the energy of W" channel is the same as the energy of the encoder input W channel. In an embodiment, the reconstruction of the FoA signal at the decoder is given by:

$$W''=(1-f^*(p1^2+p2^2+p3^2))^*W', \quad [100]$$

$$Y''=p_1^*W'+d_1^*D_1(W'), \quad [101]$$

$$Z''=p_2^*W'+d_2^*D_2(W'), \text{ and} \quad [102]$$

$$X''=p_3^*W'd_3^*D_3(W'), \quad [103]$$

where f is a constant (e.g., f=0.5) and D1(W"), D2(W') and D3(W') are the outputs of decorrelator unit 503. In an example embodiment, core decoding unit 501 is an EVS decoder and the core coding bits comprise an EVS bitstream. In other embodiments, core decoding unit 501 can be any mono channel codec.

Figure 6:
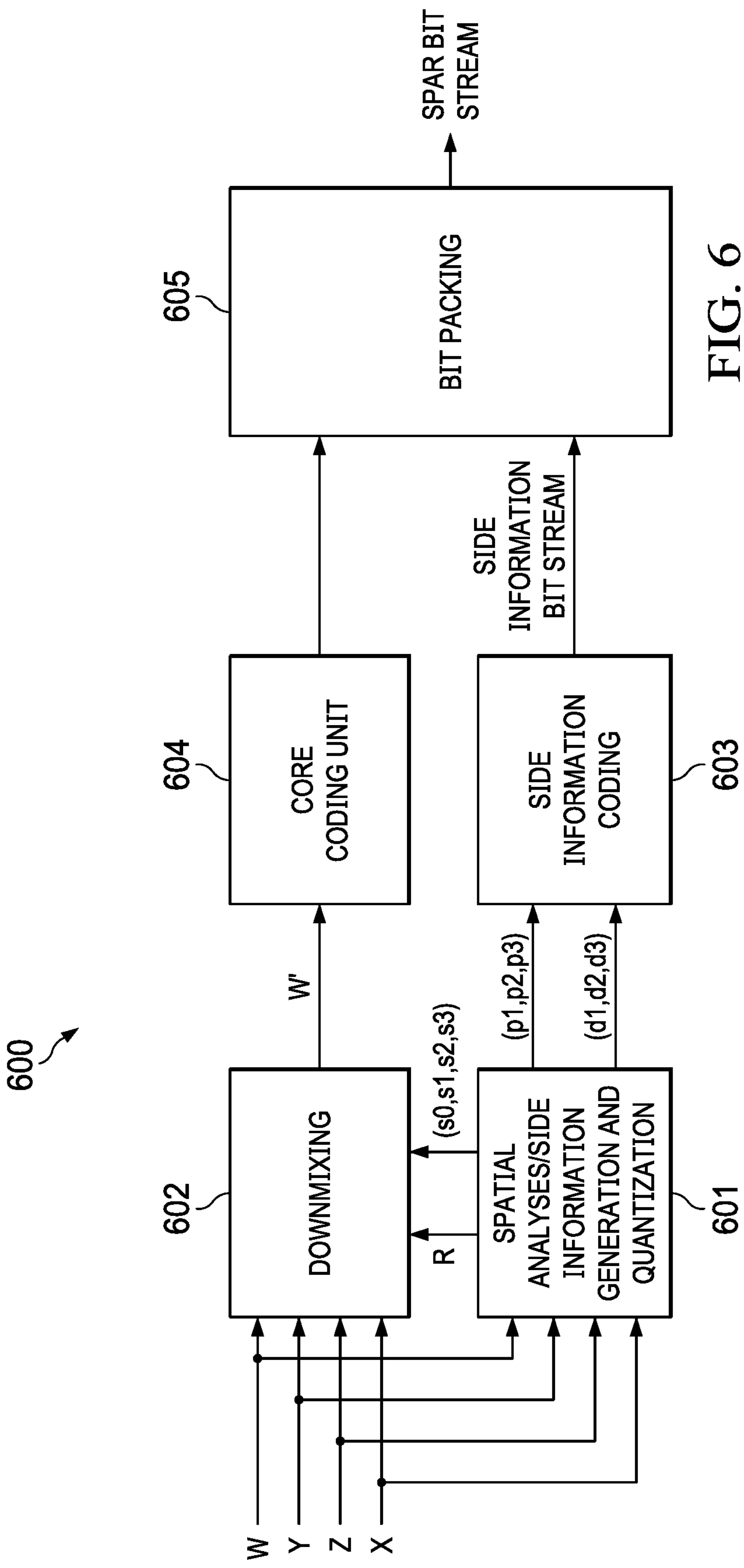
FIG. 6 is a block diagram of a SPAR FOA encoder operating in one channel downmix mode with adaptive downmix scheme, according to an embodiment.

FIG. 6 is a block diagram of SPAR FOA encoder 600 operating in one channel downmix mode with adaptive downmix scheme, according to an embodiment. SPAR encoder 600 takes an FoA signal as an input and generates a coded bitstream that can be decoded by SPAR decoder 500 described in FIG. 5, wherein the FoA. input is given by W, Y, Z and X channels. The FoA input is fed into a spatial analyses/side information generation and quantization unit 601 that analyses the FoA. input, generates input covariance estimates, and based on the covariance estimates, computes input downmixing gains ($s_0$, $s_1$, $s_2$ and $s_3$) and a downmix scaling gain (r). In an embodiment, input downmixing gain $s_0$ is equal to 1.

Spatial analyses/side information generation and quantization unit 601 computes prediction gains and decorrelation gains based on the input covariance estimates, input downmixing, gains and downmixing scaling gain, such that prediction gains and decorrelation gains are within a specified quantization range and then quantizes them. The quantized side information, comprising prediction gains and decorrelation gains, is then sent to side information coding unit 603, which codes the side information into a bitstream. The FoA input, input downmixing gains and downmix scaling gain are fed into downmixing unit 602 which generates the one channel downmix W' (also referred to as primary downmix channel or representation of dominant eigen signal) by applying the input downmixing gains and the downmix scaling gain to the FoA input. The W' output of downmixing unit 602 is then fed into a core coding unit 604 that codes the W' channel into the core coding bitstream. The output of core coding unit 604 and side information coding unit 603 are packed into a SPAR bitstream by bit packing unit 605.

In an embodiment, spatial analyses/side information generation and quantization unit 601 computes the energy estimate of the decoder output W" of decoder 500 and equates it to the energy estimate of the encoder input W of encoder 600, while computing the downmix scaling gain, prediction gains and decorrelation gains, thereby preserving energy. In an example embodiment, core coding unit 604 is an EVS encoder and the core coding bits comprise an EVS bitstream, In other embodiments, core coding unit 604 can be any mono channel codec.

Example System Architecture

Figure 7:
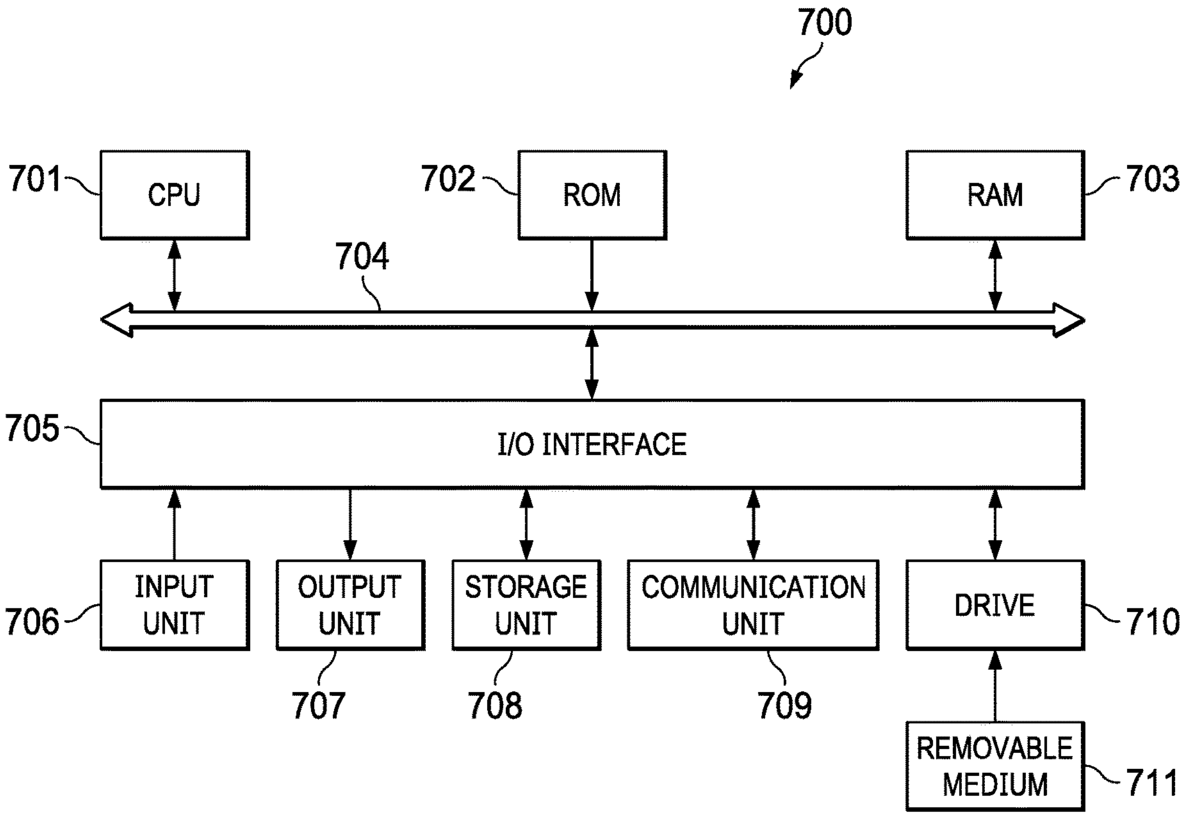
FIG. 7 is a block diagram of an example device architecture, according to an embodiment.

FIG. 7 shows a block diagram of an example system 700 suitable for implementing example embodiments of the present disclosure. System 700 includes one or more server computers or any client device, including but not limited to any of the devices shown in FIG. 1, such as the call server 102, legacy devices 106, user equipment 108, 114, conference room systems 116, 118, home theatre systems, VR gear 122 and immersive content ingest 124. System 700 include any consumer devices, including but not limited to: smart phones, tablet computers, wearable computers, vehicle computers, game consoles, surround systems, kiosks, As shown, the system 700 includes a central processing unit (CPU) 701 which is capable of performing various processes in accordance with a program stored in, for example, a read only memory (ROM) 702 or a program loaded from, for example, a storage unit 708 to a random access memory (RAM) 703. In the RAM 703, the data required when the CPU 701 performs the various processes is also stored, as required. The CPU 701, the ROM 702 and the RAM 703 are connected to one another via a bus 704. An input/output (I/O) interface 705 is also connected to the bus 704.

The following components are connected to the FO interface 705: an input unit 706, that may include a keyboard, a mouse, or the like; an output unit 707 that may include a display such as a liquid crystal display (LCD) and one or more speakers; the storage unit 708 including a hard disk, or another suitable storage device; and a communication unit 709 including a network interface card such as a network card (e.g., wired or wireless).

In some implementations, the input unit 706 includes one or more microphones in different positions (depending on the host device) enabling capture of audio signals in various formats (e.g., mono, stereo, spatial, immersive, and other suitable formats).

In some implementations, the output unit 707 include systems with various number of speakers. As illustrated in FIG. 1, the output unit 707 (depending on the capabilities of the host device) can render audio signals in various formats (e.g., mono, stereo, immersive, binaural, and other suitable formats).

The communication unit 709 is configured to communicate with other devices (e.g., via a network). A drive 710 is also connected to the I/O interface 705, as required. A removable medium 711, such as a magnetic disk, an optical disk, a magneto-optical disk, a flash drive or another suitable removable medium is mounted on the drive 710, so that a computer program read therefrom is installed into the storage unit 708, as required. A person skilled in the art would understand that although the system 700 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 709, and/or installed from the removable medium 711, as shown in FIG. 7.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 7), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An audio signal encoding method comprising:

obtaining, with at least one processor, an input audio signal, the input audio signal representing an input audio scene and comprising a primary input audio channel and side channels;

determining, with the at least one processor, a type of downmix coding scheme based on the input audio signal;

based on the type of downmix coding scheme:

computing, with the at least one processor, one or more input downmixing gains to be applied to the input audio signal to construct a primary downmix channel, wherein the input downmixing gains are determined to minimize an overall prediction error on the side channels;

determining, with the at least one processor, one or more downmix scaling gains to scale the primary downmix channel, wherein the downmix scaling gains are determined by minimizing an energy difference between a reconstructed representation of the input audio scene from the primary downmix channel and the input audio signal;

generating, with the at least one processor, prediction gains based on the input audio signal, the input downmixing gains and the downmix scaling gains;

determining, with the at least one processor, one or more residual channels from the side channels in the input audio signal by using the primary downmix channel and the prediction gains to generate side channel predictions and then subtracting the side channel predictions from the side channels;

determining, with the at least one processor, decorrelation gains based on energy in the residual channels;

encoding, with the at least one processor, the primary downmix channel, zero or more of the residual channels and side information into a bitstream, the side information comprising the prediction gains and the decorrelation gains; and outputting, with the at least one processor, the bitstream.

* * * * *